US009763253B2

(12) United States Patent
Grant et al.

(10) Patent No.: US 9,763,253 B2
(45) Date of Patent: Sep. 12, 2017

(54) CHANNEL ALLOCATION IN A COMMUNICATION SYSTEM

(71) Applicant: University of South Australia, Adelaide, South Australia (AU)

(72) Inventors: Alexander James Grant, Adelaide (AU); David Victor Lawrie Haley, Adelaide (AU); Robert George McKilliam, Adelaide (AU); William George Cowley, Adelaide (AU); Linda Mary Davis, Adelaide (AU)

(73) Assignee: University of South Australia, Adelaide, South Australia (AU)

( * ) Notice: Subject to any disclaimer, the term of this patent is extended or adjusted under 35 U.S.C. 154(b) by 190 days.

(21) Appl. No.: 14/421,526

(22) PCT Filed: Aug. 14, 2013

(86) PCT No.: PCT/AU2013/000895
§ 371 (c)(1),
(2) Date: Feb. 13, 2015

(87) PCT Pub. No.: WO2014/026228
PCT Pub. Date: Feb. 20, 2014

(65) Prior Publication Data

US 2015/0245341 A1 Aug. 27, 2015

(30) Foreign Application Priority Data

Aug. 14, 2012 (AU) ................................ 2012903489

(51) Int. Cl.
*H04W 72/04* (2009.01)
*H04B 7/185* (2006.01)
(Continued)

(52) U.S. Cl.
CPC ...... *H04W 72/048* (2013.01); *H04B 7/18539* (2013.01); *H04B 7/2121* (2013.01);
(Continued)

(58) Field of Classification Search
CPC ..... H04W 64/00; H04W 84/18; H04W 48/04; H04W 72/04; H04W 72/048;
(Continued)

(56) References Cited

U.S. PATENT DOCUMENTS 7,440,427 B1 10/2008 Katz
8,233,406 B1 * 7/2012 Johnson ................ H04L 5/0026 370/254

(Continued)

FOREIGN PATENT DOCUMENTS

WO 03/015452 A2 2/2003
WO 2011/162773 A1 5/2011

(Continued)

OTHER PUBLICATIONS

Turau, V., "Efficient slot assignment for the many-to-one routing pattern in sensor networks" In Proc of the 1st International Workshop on Sensor Network Engineering (IWSNE 2008). Jun. 18, 2008. <downloaded from Internet Oct. 18, 2013> from http://citeseerx.ist.psu.edu/viewdoc/download?doi=10.1.1.150.24&rep=rep1&type=pdf. Abstract, Sections II-IV, figures.

(Continued)

*Primary Examiner* — Michael Thier
*Assistant Examiner* — Rownak Islam
(74) *Attorney, Agent, or Firm* — McDonnell Boehnen Hulbert & Berghoff LLP

(57) ABSTRACT

Methods and systems are described which provide solutions for determining how to allocate terminals to slots in order to maximize communication system performance in the case where there is no feedback channel between a multiuser
(Continued)

1 2 RX 5 ... 3 10 TX 1 10 TX 2 ... 10 TX k Field of View satellite receiver and terminals within the field of view. Terminals operate independently of each other and choose transmission slots based upon the geographic position of the terminal. Terminals can be programmed with a slot selector to choose slots according to some deterministic or non deterministic function of the current position. A slot plan database may be used to assist in efficient slot selection. Regular and irregular grid based allocation methods are described, that reduce the likelihood that too many terminals transmit using the same slot within the field of view. Satellite induced Doppler effects can be utilized be further increase slot re-use and to improve allocation of slots so that the receiver sees an approximately uniform distribution of frequencies over the frequency band to improve system throughput. The approaches described herein greatly reduce or eliminate the probability of failure at the receiver, which has numerous implementation advantages such as reduced cost, complexity, and power consumption.

22 Claims, 11 Drawing Sheets

(51) Int. Cl.
*H04B 7/212* (2006.01)
*H04W 64/00* (2009.01)
*H04W 48/04* (2009.01)
*H04W 84/18* (2009.01)

(52) U.S. Cl.
CPC ....... *H04W 64/00* (2013.01); *H04W 72/0446* (2013.01); *H04W 48/04* (2013.01); *H04W 72/04* (2013.01); *H04W 84/18* (2013.01)

(58) Field of Classification Search
CPC .............. H04W 72/0446; H04W 88/08; H04B 7/18539; H04B 7/2121; H04B 7/18532
USPC ........................................ 370/336, 328, 329
See application file for complete search history.

(56) References Cited

U.S. PATENT DOCUMENTS

| | | | | |
|---|---|---|---|---|
| 8,483,616 | B1 * | 7/2013 | Hall | H04W 72/082 370/442 |
| 8,682,331 | B2 * | 3/2014 | Nagaraja | H04W 36/30 370/328 |
| 2002/0061730 | A1 | 5/2002 | Hart et al. | |
| 2004/0203727 | A1 * | 10/2004 | Abiri | H04W 16/06 455/423 |
| 2005/0090199 | A1 | 4/2005 | Fleeter et al. | |
| 2009/0214216 | A1 | 8/2009 | Miniscalco et al. | |
| 2009/0257380 | A1 * | 10/2009 | Meier | H04W 72/082 370/329 |
| 2009/0303110 | A1 * | 12/2009 | Gregory | G01S 13/86 342/25 A |
| 2010/0034311 | A1 * | 2/2010 | Hasegawa | H04L 5/0007 375/267 |
| 2010/0226268 | A1 * | 9/2010 | Tao | H04W 72/042 370/252 |
| 2011/0086636 | A1 | 4/2011 | Lin | |
| 2012/0034915 | A1 | 2/2012 | Arcidiacono et al. | |

FOREIGN PATENT DOCUMENTS

| | | | |
|---|---|---|---|
| WO | WO 2011/053146 | A1 | 5/2011 |
| WO | 2011/162773 | A1 | 12/2011 |

OTHER PUBLICATIONS

International Search Report with Written Opinion of PCT/AU2013/000895, dated Oct. 21, 2013, pp. 1-8.
International Preliminary Report on Patentability of of PCT/AU2013/000895, dated Oct. 16, 2013, pp. 1-5.
Supplementary European Search Report dated Feb. 26, 2016 for European Application No. EP 13 82 9601.

* cited by examiner

CHANNEL ALLOCATION IN A COMMUNICATION SYSTEM

CROSS-REFERENCE TO RELATED APPLICATIONS

The present application is a U.S. National Phase Application pursuant to 35 U.S.C. §371 of International Application No. PCT/AU2013/000895 filed Aug. 14, 2013, which claims priority to Australian Provisional Patent Application No. 2012903489 filed Aug. 14, 2012. The entire disclosure contents of these applications are herewith incorporated by reference into the present application.

INCORPORATION BY REFERENCE

The following co-pending patent applications are referred to in the following description:

Australian Provisional Patent Application No. 2012904130 titled "Communication system and method" filed on 21 Sep. 2012; and Australian Provisional Patent Application No. 2012904145 titled "Multiaccess Communication System" filed on 21 Sep. 2012.

The content of each of these applications is hereby incorporated by reference in their entirety.

TECHNICAL FIELD

The present invention relates to wireless communication systems. In a particular form the present invention relates to allocation of terminals to slots in wireless communication systems lacking feedback channels.

BACKGROUND

FIG. 1A shows a wireless communication system 1 in which a receiver 2, labelled RX wishes to receive data from each of k user terminals 10 (henceforth referred to as terminals), labelled $TX_1$, $TX_2$, . . . , $TX_k$, in its field of view 3 (there could also be multiple receivers and multiple corresponding fields of view). Communications takes place over a medium 5 which must be shared among all the terminals. The terminals may be stationary (at a fixed location), or they may be mobile e.g. portable, or fitted to a vehicle, aircraft or vessel, or space vehicle, or carried by a person or animal). We are interested in the case where there is no feedback channel from the receiver to the transmitters.

The absence of a feedback channel may be desirable to reduce the implementation complexity, cost, or power consumption of a terminal, since the terminal does not need to provide communications receiver functionality. This is of particular importance in situations, such as field deployable sensors, where terminals may be battery powered, or have a limited power source. Systems with no feedback channel from the receiver to the terminals will be called "open-loop".

There are several examples of systems which fit this model. These are described for illustrative purposes only, and are not intended to restrict the application of the described methods.

One example is a low earth orbit satellite communications, where the field of view is the footprint of the satellite, and the transmitters are ground based sensor devices equipped with wireless transmitters for the purposes of transmitting sensor data to the satellite. In this example, the field of view moves over the surface of the earth as the satellite orbits. From an orbital altitude of 700 km, the field of view is of the order of 6000 km wide. FIG. 1B shows an example of a communication system with a satellite receiver with a moving field of view for communicating with k transmitters. At a first point in time the receiver has a first field of view 6 which contains transmitters $TX_1$, and $TX_2$. At a later time, the satellite has moved to the right, and thus has a new field of view 7 which contains transmitters $TX_i$, $TX_j$ and $TX_k$. In one scenario, power consumption is critical for both the ground based sensors and the satellite payload. In order to increase the lifetime of the sensors and to reduce the cost of the payload it may be advantageous to have no feedback link from the satellite to the sensors.

Another example is cellular communications, where the field of view is the coverage area (sometimes called a cell) of a particular base station. Again, the terminals may be low cost sensors equipped with cellular transmitters in order to send their sensor data to the base station but lacking a feedback channel to allow coordination of transmissions as is typically performed in cellular communications systems.

The shared physical communications medium may be partitioned into a number of channels. These channels may be time slots in a time division multiple access system, frequency slots in a frequency division multiple access system, subcarriers in an orthogonal frequency division multiple access system, or spreading sequences in a code division multiple access system. More generally, the slots may be hybrids of any of these, where a slot corresponds to some subset of the overall degrees of freedom of the system (including degrees of freedom resulting from the use of multiple transmit and or receive antennas). Regardless of the underlying method of dividing the medium into channels, we shall refer to these channels as "slots". We do not require that the slots be orthogonal, although in many instances slots are chosen to be orthogonal.

In some embodiments the receiver is equipped with a multiuser decoder that is capable of successfully decoding some number of simultaneous transmissions by different terminals within the same slot. In practice, the number of simultaneous transmissions within a slot that can be successfully decoded depends on a variety of systems parameters, including the received signal to noise ratio, the radio channel propagation characteristics between each terminal and the receiver, and the kind of multiuser decoder being used. For the sake of a simple explanation, we will assume that the multiuser receiver can successfully decode $m \geq 1$ simultaneous transmissions within a single slot. More detailed receiver characteristics can be easily taken into account if they are known.

However in such systems a problem exists in determining how to allocate terminals to slots in order to maximise system performance. There are several metrics of system performance that could be adopted. We are interested in improving the probability that the receiver can correctly decode the data transmitted by the terminals. In other words, we would like to minimise the probability that the number of simultaneous transmissions exceeds m in a given slot, where m is the receiver characteristic described above (ie the maximum number of transmissions in a slot that the receiver can successfully decode).

The allocation of terminals to slots is made more difficult by the lack of a feedback channel from the receiver. This prevents the use of coordinated slot allocation in which the allocation is performed by some central controller. There are a number of known approaches to this problem such as fixed allocation, and random access.

A fixed allocation method permanently allocates one slot to each terminal. This is an instance of circuit switching where the slot is allocated for the entire duration of system operation. This approach has several well-known disadvantages. It is wasteful of channel resources, as it does not allow slots to be re-used. Furthermore, the slot allocations must be hard-wired into the terminals when the system is open-loop, as there is no other way to control the channel allocation after deployment. In a system where the terminals are mobile (or where the field of view itself moves, for example in a low-earth-orbit satellite system), it may not be known in advance which terminals will be in the field of view. As a result, fixed allocation can assign only up to m terminals to any one slot. In a satellite communications context, this slot would not be able to be reused by any other terminals globally.

Another well-known approach to slot allocation is random access (also known as slotted ALOHA). In this approach, slots are assigned to terminals randomly. Suppose that we have k terminals in the field of view and n available slots. Under the random access approach, each terminal selects a slot uniformly at random. Then the probability that a particular slot is chosen by m terminals is $$P_m = \binom{k}{m}\left(\frac{1}{n}\right)^m\left(\frac{n-1}{n}\right)^{k-m} \quad \text{Equation 1}$$

This is known to be well approximated by the Poisson approximation to the binomial distribution:

$$P_m \approx \frac{1}{m!}e^{-\lambda}\lambda^m \text{ where } \lambda = \frac{k}{n} \quad \text{Equation 2}$$

Using this approximation, the probability that a slot has more than m terminals is $1-Q(m+1, \lambda)$ where $$Q(a, z) = \frac{\Gamma(a, z)}{\Gamma(a)} = \frac{1}{(a-1)!}\int_z^\infty t^{a-1}e^{-t}\,dt \quad \text{Equation 3}$$

is the regularised incomplete gamma function. FIG. 2 plots curves 20 of the probability that a slot has more than m terminals versus $\lambda=k/n$ for m=1, 2, . . . , 10. Given a particular target decoder failure probability p, which is the probability that a slot contains more than m terminals, we can compute the maximum value of $\lambda=k/n$ that is supported for this random access scheme as:

$$\lambda(p)=Q^{-1}(m+1,1-p) \quad \text{Equation 4}$$

where $Q^{-1}$ is the inverse regularised gamma function (which can be easily numerically computed using software such as Mathematica). Curves 30 of the maximal values of $\lambda(p)$ versus m for $p=10^{-1}, 10^{-2}, \ldots, 10^{-6}$ are plotted in FIG. 3. From this figure, we see that if we desire a very low probability of decoder failure, we are restricted to a low value of $\lambda=k/n$. For example at $p=10^{-6}$ and m=5, we can only support $k\approx n/3$ terminals in n slots, despite being able to decode 5 simultaneous users in a slot. If we are willing to accept a higher probability of decoder failure, then we can support many more terminals. For example, at p=0.1 and m=5, we can support k=3n terminals. However in cases where there is no feedback channel, a higher probability is typically less desirable, as there is no way to request retransmission of failed transmissions.

There is thus a need to provide methods and systems for determining how to allocate terminals to slots in order to improve, and if possible, maximise system performance compared to such fixed and random access allocation schemes, or alternatively to at least provide users with a useful alternative to such schemes.

SUMMARY

According to a first aspect, there is provided a method for allocating a transmission slot to a terminal in a communication system, the communication system comprising a plurality of terminals and a common receiver for receiving transmissions from the plurality of terminals, the common receiver having a field of view, the method comprising:

obtaining the current geographic position of the terminal; and allocating a transmission slot based upon the obtained geographic position of the terminal.

According to a second aspect, there is provided terminal for use in a communication system comprising:

a transmitter;

a position module which obtains a position of the terminal; and a slot selector module for selecting a transmission slot based upon the obtained position.

In further aspects of the method and terminal, the current (geographic) position may be a stored position, an estimated position (eg from GPS signals) or received over a wired or wireless communication link. The obtained position may be an estimate or approximation of the actual position. The position may be obtained from a position determination module. The position determination module may provide position updates (periodically, continuously, or on request). In a further aspect there is no feedback channel from the common receiver to the plurality of terminals or a feedback channel from the common receiver to the plurality of terminals is present but is not being used for allocation of a transmission slot and allocation of a transmission slot to the terminal is performed independently of the common receiver or other terminals.

In a further aspect, the slot selection (or allocation) uses a slot plan database that comprises a plurality of geographic regions, and each geographic region is associated with a set of one or more slots. Allocation is performed by determining the geographic region that contains the geographic position of the terminal and selecting a slot from the set of one or more slots associated with the determined geographic region. The slot plan used by the slot plan database may allocate each slot one or more times within the field of view. In a further aspect each slot is allocated at most a fixed number of times within the field of view. The use of geographic information allows spatial re-use, in which the same slots used in the field of view are re-used elsewhere in a non-overlapping field of view. The regions may be stored as rectangular regions which form a rectangular grid. This grid can be used to tile the plane to allow reuse of slots. In one aspect the boundaries of the regions are irregular such that regions form an irregular partition of an operational region defined by the plurality of geographic regions. Allocation may be performed using a graph-colouring algorithm. Graph colouring may be used for cases for cases where the boundaries of the region are regular (eg form a rectangular grid), as well as for cases where the boundaries of the region are irregular. In one aspect each region is associated with a single vertex in a graph, and an edge is created between any pair of vertexes in the graph which are within a bounding region. This may be a circle with diameter D, and may be the smallest circle that completely bounds the estimated field of view of the common receiver. In one aspect each of the geographic regions is a rectangle geographic region and the slot database stores NM geographic regions which form a rectangular grid with sides of length X and Y, where N is the number of columns in the grid and M is the number of rows in the grid the rectangular grid, and the step of determining the geographic region that contains the geographic position (x,y) of the terminal comprises determining the geographic region number R using R=N(y mod Y)+(x mod X). In one aspect the dimensions (X, Y) of the rectangular grid are determined based upon the estimated field of view of the common receiver (for example the rectangular grid may bound the field of view). Further reuse can be achieved by taking into account Doppler effects, for example to split the grid into positive and negative Doppler regions so that slots may be reused in the two regions. Consider the case of the rectangular grid, X=2Y where the Y dimension is aligned with the direction of motion of the common receiver and the dimensions (X, Y) of the rectangular grid approximately bound half of the field of view of the common receiver. In one aspect the step of assigning a set of one or more slots to each geographic region includes an assignment wherein the same set of slots are used for both a first region and a second region, and the first and second regions correspond to different regions in a common field of view of the common receiver, the first region having positive Doppler offsets and the second region having negative Doppler offsets. Allocation of slots may be performed so that the receiver sees an approximately uniform distribution of frequencies over the frequency band. This may be further based upon obtaining a probability density function q* for the transmission frequencies used by the terminals. The probability density function q* for the transmission frequencies used by the terminals may itself be uniform. In one aspect the probability density function q* for the transmission frequencies used by the terminals is limited to be within a predefined bandwidth, for example based upon system or regulatory constraints. The probability density function q* may be obtained based upon numerical optimisation techniques. In a further aspect, geographic allocation may be used to obtain a set of slots for a local group of transmitters, and selection of a slot in the set of slots by a terminal is locally coordinated with the local group of terminals.

In a further aspect a communication system is provided comprising a plurality of terminals according to the second aspect (and further aspects) and a common receiver for receiving transmissions from the plurality of terminals. In a further aspect a receiver for use in the communication system may be provided.

BRIEF DESCRIPTION OF DRAWINGS

Various embodiments will be discussed with reference to the accompanying drawings wherein.

In the following description, like reference characters designate like or corresponding parts throughout the figures.

DESCRIPTION OF EMBODIMENTS

Figure 1A:
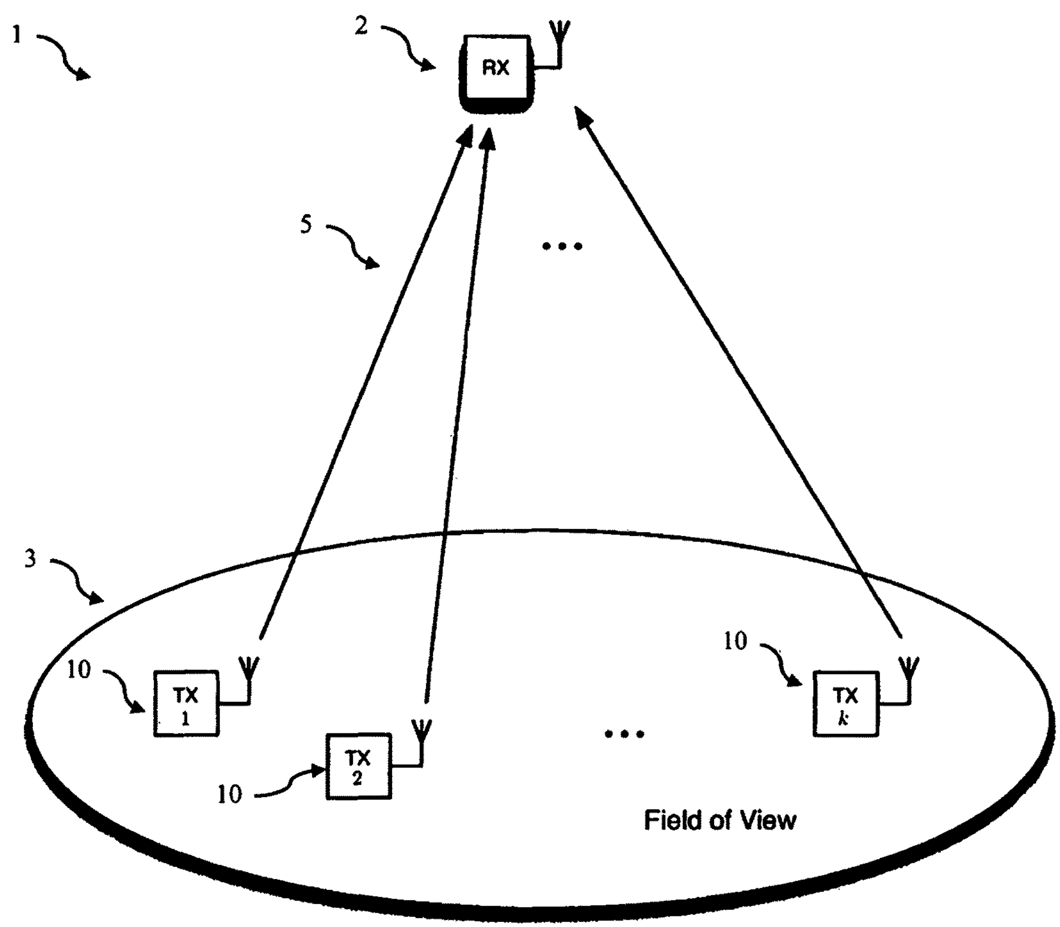
FIG. 1A is a schematic diagram of a communications system comprising of k transmitters communicating with a receiver according to an embodiment.
Figure 1B:
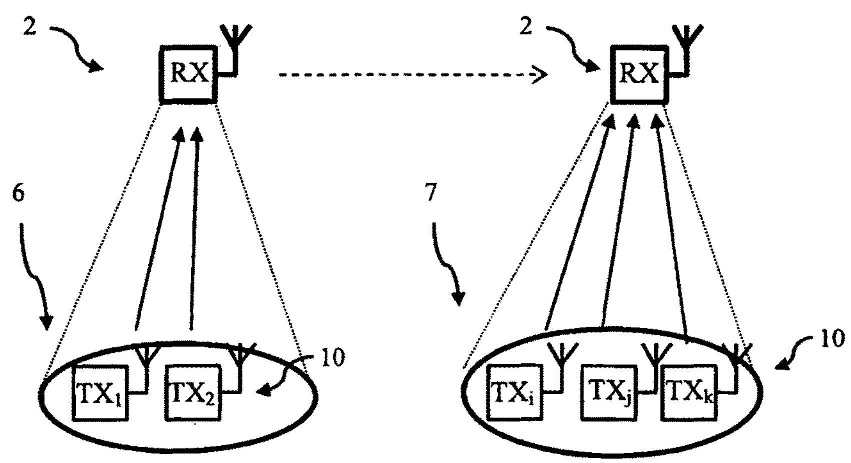
FIG. 1B is a schematic diagram of a communications system comprising a satellite receiver with a moving field of view for communicating with k transmitters according to an embodiment.
Figure 2:
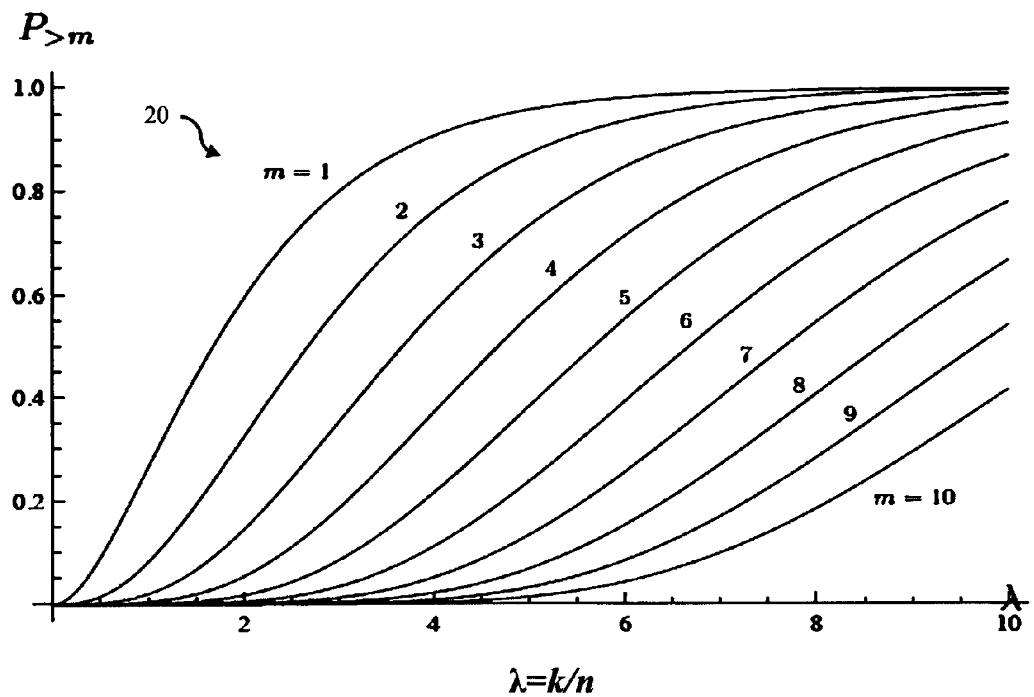
FIG. 2 is plot of the probability of decoder failure versus $\lambda=k/n$ for m=1, 2, . . . , 10.
Figure 3:
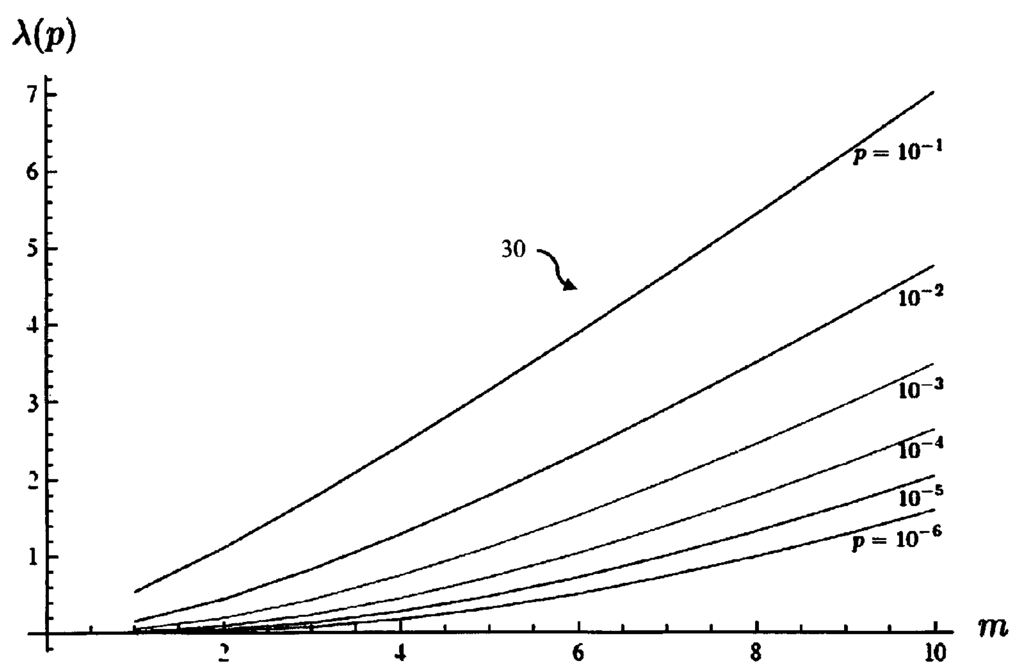
FIG. 3 is a plot of the maximum $\lambda(p)$ versus m for $p=10^{-1}$, $10^{-2}$, . . . , $10^{-6}$.
Figure 18:
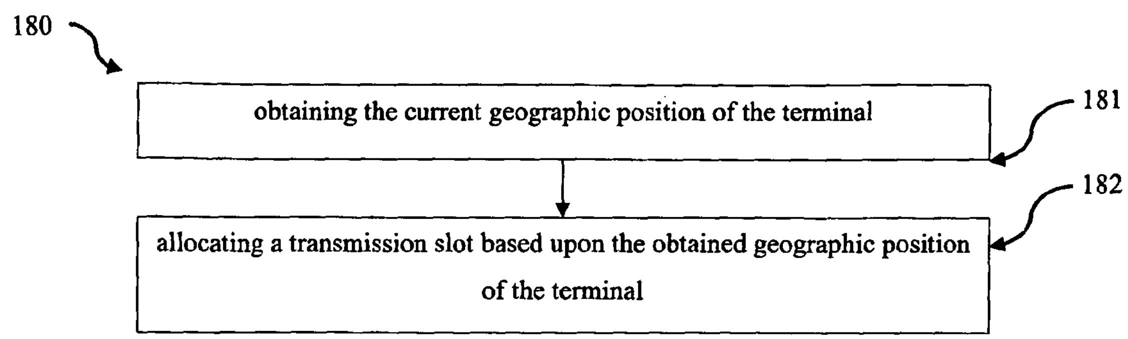
FIG. 18 is a flow chart of a method for allocating a transmission slot to a terminal in a communication system according to an embodiment.

Embodiments of a wireless communication system, such as that illustrated in FIG. 1A, will be described in which terminals allocate or select a transmission slot based upon the geographic position of the terminal. That is the geographic position information, which is available to a terminal either from a memory, position determination module, or another device, is used to select a slot. FIG. 18 is a flow chart of a method 180 for allocating a transmission slot to a terminal in a communication system according to an embodiment. The method comprises the steps of obtaining the current geographic position of the terminal 181; and allocating a transmission slot based upon the obtained geographic position of the terminal 182. Multiple transmission slots may be allocated (ie one or more). The receiver may be a multiple access or multiuser receiver that can successfully decode m≥1 simultaneous transmissions within a single slot. It is to be noted that the methods can be used in the case where the receiver can only decode a single transmission in a slot (ie m=1). In this case the methods described can be used to help distribute transmissions to avoid overlap. Embodiments described herein are also useful in communication systems where there is no feedback channel from the receiver to the terminals. In this case allocation of a transmission slot is performed based on geographic position, and independently of the receiver or other terminals. However it is to be understood that embodiments of the methods described herein can also be used where a feedback channel is present but is either not being used, or is being used for some other purpose. Similarly embodiments of the methods described herein can also be used to assist in slot allocation in the case where a feedback channel is being used to coordinate transmissions from several terminals.

The geographic position information may be obtained from a variety of sources. For example, they may be placed in fixed locations and have their position programmed into a memory. Alternatively, they may have a global positioning system (GPS) receiver which provides an accurate position and time reference. This is of particular importance in sensor deployments, where the sensors may wish to tag their measurements with the geographic location and time of where and when the measurement was taken. Other mechanisms whereby a terminal may obtain position information include using location based services provided by a wireless communications system. The terminal may receive the position over a wireless link and pass the received position to the slot allocator. In this case, or in cases where the position is estimated or determined from received signals (eg GPS) the position may only be temporarily stored, or stored in a transitory state (eg in a register or a buffer). The methods that we describe do not rely on the particular method by which geographic position of the terminal is provided. Further the obtained position may be an estimate of approximation of the actual position of the terminal. The required accuracy of the estimation will typically depend upon the implementation details, such as field of view of the receiver, the distribution of terminals and whether there is a minimum position spacing's of terminals, etc.

Further, by using geographical information it is possible to take advantage of spatial re-use to allocate m terminals to each slot within one field of view, and re-use those same slots elsewhere in a non-overlapping field of view. For example if the field of view is 10° of longitude (or latitude), the slot could be allocated based about the longitude (or latitude) mod 10, so that terminals with longitudes (or latitudes) of 1°, 11°, 21°, etc. would be allocated slot 1, and terminals with longitudes (or latitudes) of 2°, 12°, 22°, etc would be allocated slot 2 This provides advantages over the fixed allocation method discussed above and is of particular importance in cellular or satellite systems which aim to provide national or even global coverage.

Figure 4:
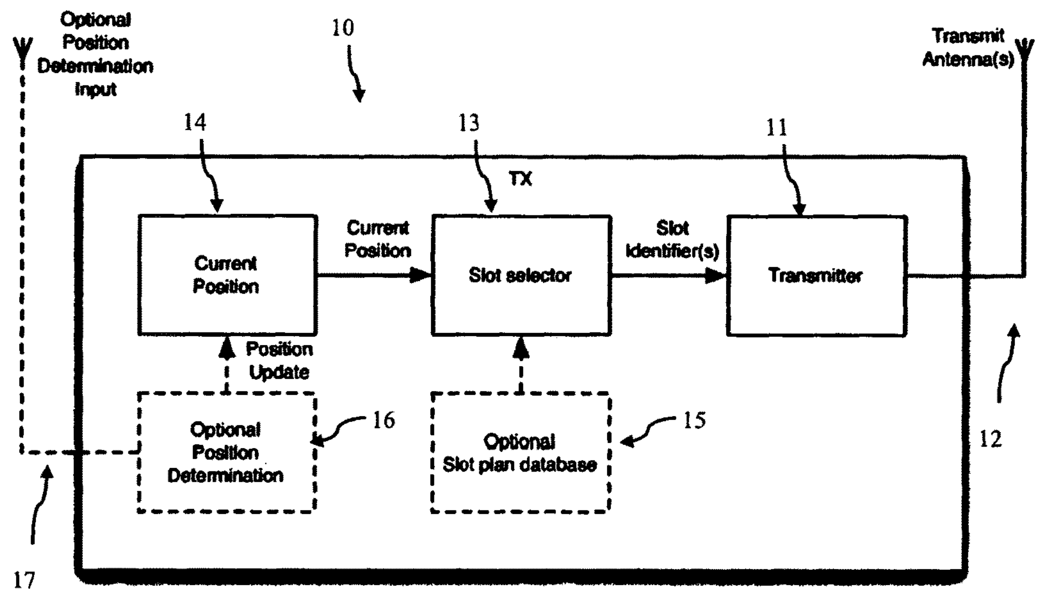
FIG. 4 is a block diagram of a terminal with geographic location based slot selection according to an embodiment.

FIG. 4 shows a block diagram of a transmitter 10 according to an embodiment. The terminal 10 includes a transmitter 11, transmit antenna(s) 12, a slot selector 13, and a memory or storage for storing the current position of the terminal 14. The terminal also optionally includes a slot plan database 15 and optionally includes a position determination function/module 16 and associated position determination input 17, such as an antenna. The transmitter, which is used to communicate data to the receiver, transmits its data in the slot, or slots identified by the slot selector. The details of the transmitter, e.g. specific modulator, data framing etc. are not shown, as our methods can be used with a wide variety of different transmitters, as will be apparent to anyone skilled in the art. As described above, the slots may be time slots, frequency slots, subcarriers, spreading sequences or any hybrid combination of these, including variations using multiple antennas. In one embodiment the transmitter receives a binary data stream, or sequence, packet, or frame and performs transmission related functions such digital-to-analog conversion, filtering and modulation onto the selected carrier using an appropriate a modulation scheme (PSK, QAM, GMSK, OFDM etc). The transmitter may also implement functionality such as error control coding, interleaving, insertion of pilot data etc to assist in increasing the robustness of the transmission to channel effects, interference, and other noise sources. In one embodiment the transmitter is used to send relatively short transmissions occupying relatively narrow bandwidth (eg 1, 2, 5, 10, 20, 40 kHz etc) in the VHF or UHF band.

The slot selector 13 takes as input the current position of the terminal 14 and outputs one or more slot identifier(s), which are used by the transmitter to select the slot for transmission. The specific format or coding of the current position and slot identifier is immaterial to the invention, and there are many ways that these may be represented as would be apparent to the person skilled in the art (eg an integer in a slot sequence). The slot selector chooses slots according to some deterministic or non-deterministic function of the current position, and optionally the slot plan database. One example of a non-deterministic function is a random selection from a set of possible slots.

The current position of the terminal 14 is stored in a memory (eg RAM, a processor register, hard disk, flash memory etc) which contains the current position (or position estimate) of the terminal. This may be pre-programmed, or it may be updated from time to time, either manually, or automatically, via an optional position determination device or module. The position may be stored as position according to a common geographic coordinate system eg the position may be a latitude and longitude according to WGS 84, or an (x,y) position in a local geographic coordinate system. Alternatively the position could be grid reference or index in a common coordinate system used by the transmitters and receivers.

The optional position determination module 16 provides position updates to the current position store, based on signals that it receives from its position determination input. The specific implementation of the position determination function is immaterial to our method. It could for example be a global positioning system receiver, or alternatively, it could be a device which wirelessly accesses a network location service over a cellular or wireless local area network connection.

The optional slot plan database 15, described in more detail below contains a pre-programmed database which associates a geographic region to one or more slot(s). That is the database stores mappings or relationships $R_i \rightarrow \{s_j\}$ where $R_i$ is the ith region, and $\{s_j\}$ is the set of slots allocated to this region. The set of slots may be a single slot or may contain up to p slots (ie j=1 . . . p). The number of slots per region may be constant, and may be equal to the total number of slots a receiver is able to simultaneously decode (i.e. p=m), or the number of slots per region may be varied. The database could be created in a variety of ways as would be known to the person skilled in the art. For example a mapping table could store region indexes and map these to slot indexes. Other tables may then map a region index to properties of the region, such as geographic boundaries. Similarly a slot database may map a slot index to properties of the slot used for transmitting in the slot (eg timings, frequencies, spreading codes etc). This database may be pre-programmed, or it may be updated from time to time, either manually or automatically via a wired or wireless connection (not shown). Allocating a transmission slot thus involves determining the region linked to or containing the transmitters geographic positions, looking up or obtaining the set of slots associated with that region, and then selecting one of the slots from the set of slots.

The approach of using geographic position information available to the terminals in order to select slots has several advantages over prior art solutions such as fixed allocation or random access, such as:

- it does not require feedback from the receiver to the terminal;
- it does not require communication between terminals;
- it does not require real-time central coordination of slot selection;
- it supports terminal mobility and/or a moving field of view; and
- it can greatly reduce (or even eliminate) the probability of decoder failure at the receiver. This is accomplished for example by using slot plans which use knowledge of the spatial distribution of terminals (see the discussion on the slot plan database).

The slot plan database 15 comprises of an association between geographic areas and slot(s). In one embodiment the slot plan database stores this information hierarchically in a tree data structure in which each level of the tree provides a finer grained division of the area. A memory in the terminal can be used to store the database, and a processor can contain software code or instructions to lookup entries in the database. Other hardware, software and combined hardware software implementations can also be used.

Storing the database using a tree allows the slot selector to search the database using well-known tree search methods, which allow the slot selector to reach a leaf of the tree in time that scales only logarithmically with the depth of the tree. Each leaf represents a geographic region, and has an associated set of slots. This has the advantage that the slot selector can very rapidly determine the slot(s) from the current position. This tree is described in more detail below.

Various slot plans can be implemented with varying performance, and the choice of the slot plan can be guided based upon expected implementation conditions. For example there is little point in assigning slots to geographic areas where there are known to be no terminals as this wastes available slots. Similarly assigning only a few slots to a large geographic region which is expected to contain a large number of terminals (for example many more than m terminals), will likely result in a high failure probability. Thus in one embodiment knowledge of the expected statistical spatial distribution of terminals (but not necessarily the specific location of individual terminals, which may not be known) is used in developing an efficient slot plan. For example the boundaries or size of each region in the database can be determined based upon expected statistical spatial distribution of terminals. However it is to be understood that a range of information about the expected implementation may be used to develop an advantageous or efficient slot plan (assignment of slots to geographic areas)

Below we give three example embodiments of slot plan design which can improve efficiency in certain implementations. In one embodiment each slot is used only once within a field of view, regardless of the position of the field of view, and slots may then be re-used in non-overlapping fields of views. In other embodiments a slot may be used more than once in a field of view (ie one or more times). In some embodiments a slot may be used at most a fixed number of times q in the field of view. This fixed number may be based upon the characteristics of the receiver. Typically $q \leq m$, where m is the number of transmissions that the multiuser receiver is able to decode in a slot. Other slot plans can be designed by applying existing methods for frequency planning in cellular systems, or for spot-beam design in geostationary communications satellites.

Note that our approach is novel compared to these previous systems, as it uses geographic position information available to the terminal to autonomously decide which slot(s) to use. In a cellular system, the channels are assigned by a central controller. In a spot beam satellite system, the available channels are determined by the design of the satellite antenna, and are again centrally controlled. Embodiments of the system described herein do not require any central coordination.

Figure 5:
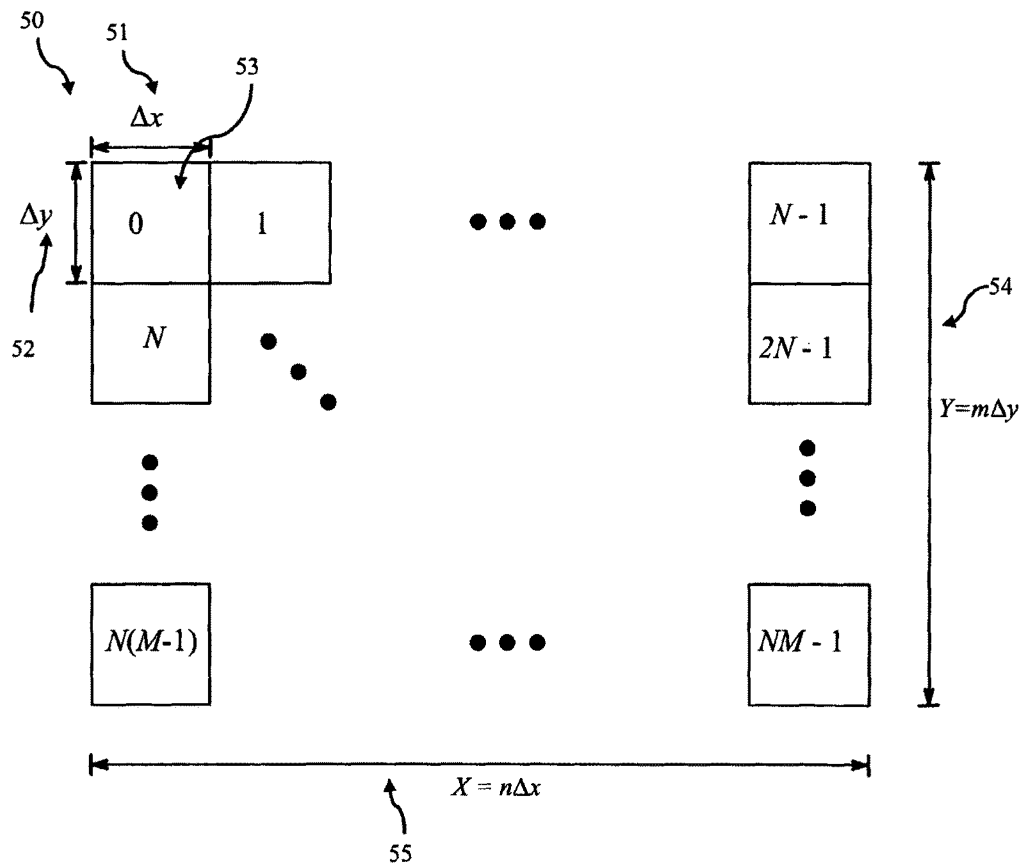
FIG. 5 is a schematic diagram of a grid based slot allocation scheme according to an embodiment.

In a first example embodiment, slot allocation is performed based upon a rectangular grid. This can be used if the terminals are expected to be approximately uniformly distributed throughout the total coverage area; which we will refer to as the plane. Suppose that the field of view can be approximated by a rectangle 50, X meters by Y meters (we adopt Cartesian coordinates for this example, however other coordinate systems could be used). FIG. 5 shows a slot allocation method 50 based on a rectangular grid. The horizontal direction 55 is divided into N columns, while the vertical direction 54 is divided into M rows. The field of view is divided into NM non-overlapping rectangular regions 53 with horizontal side 51 of length $\Delta x$ and vertical side 52 of length $\Delta y$, and thus having an area of $\Delta x \Delta y$ square meters. To each of the NM regions 53, we can allocate one or more of the n slots. For example, if NM=n, the slot assigned to a region could be identified simply by the region number 0, 1, 2, . . . , NM−1, or by any other one-to-one mapping. That is the region index=slot index, and each slot is only associated with one region. Alternatively, we could have more than one slot allocated to a region if NM<n. If the multiuser receiver can correctly decode m terminals in one slot, we can allocate each slot to at most m regions.

Figure 6:
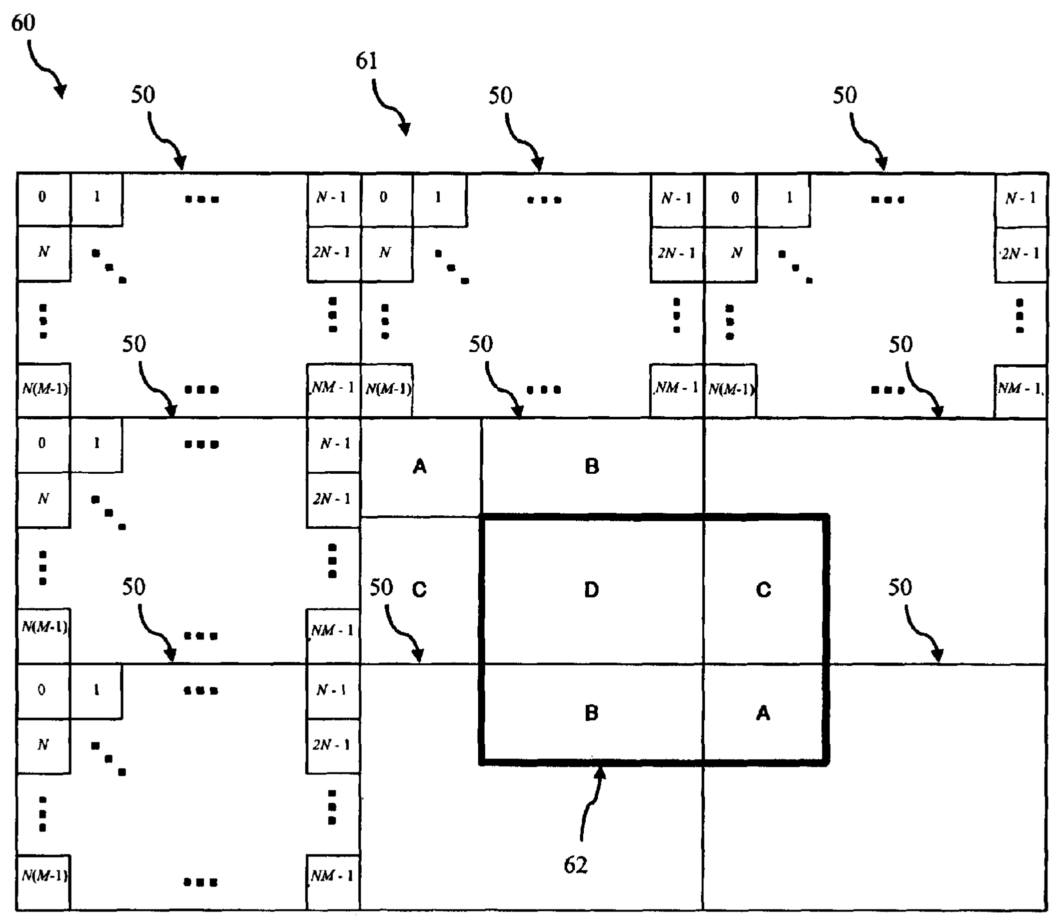
FIG. 6 is a schematic diagram illustrating tiling of a plane using a rectangular grid according to an embodiment.

FIG. 6 shows a schematic diagram 60 of a tiling of the plane 61 by copies of this rectangular grid 50 pattern. This tiling has the very beneficial property that any X by Y meter rectangle placed on the plane contains exactly the same regions as the original grid pattern shown in FIG. 5, just re-arranged. Consider the X×Y field of view indicated by the heavy outlined rectangle 62. This overlaps four of the tiled rectangles. However, as indicated by the labelling A, B, C, D, we see that the field of view contains all of the same regions as the original grid, just re-arranged. This is the case no matter where the field of view is placed on the plane.

For this tiling of grid assignments, the slot selector can determine which region it belongs to using modulo arithmetic. Suppose the terminal is at position (x, y) in the same coordinate system used by the grid and tiling. Then the region number R is determined by $$R=N(y \bmod Y)+x \bmod X) \quad \text{Equation 5}$$

where a mod b is the well-known modulo operator, which computes the remainder after dividing a by b. Once the terminal knows which region it belongs to, it can select its slot according to the assignments of slots to regions. If only one slot has been assigned to region R, the slot selector chooses that slot. Alternatively, if region R has been assigned more than one slot, it can choose from this list of slots randomly.

For the sake of comparison with the random access method described above, suppose now that NM=n/m and that each region has been assigned a single slot, with each slot being assigned m times. In the case that the terminals are spatially distributed according to a two-dimensional Poisson process with mean k/n, the performance of this scheme is identical to the random access method described above.

However, in practice, terminals may be spatially distributed according to some other method. For example, they may be manually placed, or otherwise uniformly distributed on the plane such that there are only m terminals in each region.

In another scenario, the terminals may be randomly located, but adhere to some minimum separation distance d. This could be the case for vehicles, vessels or aircraft maintaining safe separation distances. In this scenario, if $$2\pi r^2 > \frac{1}{m}(\Delta x + r)(\Delta y + r) \quad \text{Equation 6}$$

there can never be more than m terminals within one region.

In such scenarios, this grid based assignment eliminates the probability that too many terminals transmit using the same slot within the field of view, no matter where the field of view is placed on the plane. This tiling of grid assignments demonstrates that it is possible to devise a slot plan which has the property that no matter where the field of view is placed, each slot is used only m times within the field of view. This allows us to eliminate the probability that the multiuser decoder cannot decode due to too many terminals decoding in the same slot. This provides a significant benefit compared to the random access method described above.

Figure 7:
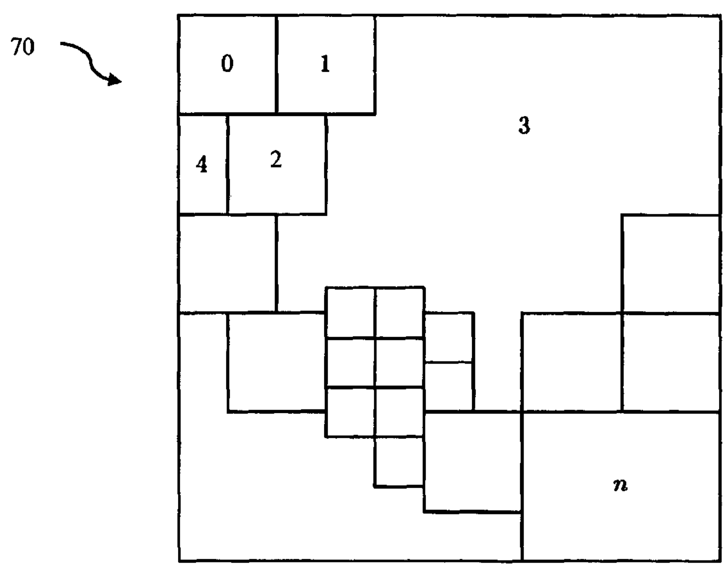
FIG. 7 is a schematic diagram of the irregular partitioning of an area according to an embodiment.

In a second example embodiment, slot allocation is performed based upon the use of irregular partitions. The grid-based slot allocation described above provides blanket coverage of the plane. This assumes a uniform density of terminals over the plane. In practice, it may be known that terminals follow some non-uniform density. For example, there may be more terminals in urban areas than rural areas (or vice versa). In a maritime application, there may be more terminals in shipping lanes than in other areas of the oceans (and no terminals on land areas). Similarly, in an aviation example, there may be more terminals distributed along heavily traveled flight paths. In such instances, it is beneficial to adopt an irregular partition of the plane. An illustrative example is shown in FIG. 7 which is a schematic diagram of the irregular partitioning of an operational region (using an irregular grid slot allocation scheme) according to an embodiment. The operational region may be region traced or swept out by a satellite rotating around the earth, or an airborne receiver. The operation region may also be a portion of the total area swept out corresponding to a region (or regions) where terminals may use the system. This may exclude countries where the system is not used. An irregular pattern allows the system to allocate more slots to areas where there are expected to be more terminals Unlike the regular grid pattern and tiling discussed above, more care must be taken with irregular assignments to make sure that regardless of the location of the field of view, that each slot appears no more than m times within the field of view. One method to achieve this goal is to assign slots to regions using graph colouring, which will now be described. However it is to be noted that graph colouring can also be used in the case of the region boundaries being regular (eg a rectangular grid such as that shown in FIGS. 5 and 6).

Suppose that the dividing of the entire plane into regions has already been performed, and that the diameter of the field of view is D meters (if the field of view is not circular, D is the diameter of the smallest circle that completely covers the field of view). Define a graph G=(V, E) with vertexes V and edges E as follows. For each region we create a single vertex in the graph corresponding to that region. We create an edge between any pair of vertexes which correspond to regions that are separated by less than D meters. We now apply known graph colouring algorithms to assign one of the integers 1, 2, . . . , n to each vertex (these are the n "colours" in the graph colouring). This is always possible if the chromatic number of the graph G is greater than n. We can now assign slots to regions according to the integers assigned to the corresponding vertexes by the graph colouring algorithm. Using this same graph G, we can even optimise the number of slots required by first determining (or upper bounding) the chromatic number κ of the graph G and setting n=κ. A graph colouring has the property that no two adjacent vertexes in the graph (vertexes joined by an edge) share the same colour. Translating this to the slot allocation, this means that no two regions closer than D meters will share the same slot. Since we have chosen D to be the diameter of the field of view, this yields the desired property that regardless of where we place the field of view, each slot is used only once within the field of view. More generally we can define the use of a bounding region rather than a minimum position separation. That is an edge is created between any pair of vertexes in the graph which are within a bounding region. This can be a circle with a diameter D, for example where the circle is the smallest circle that completely bounds the estimated field of view of the common receiver. However the bounding region could be a rectangle (eg sides X and Y), an ellipse, a regular shape (hexagon, octagon), or even an irregular shape. These shapes may be shaped which cover an expected field of view, or as will be discussed below in relation to Doppler induced frequency reuse, half of the expected field of view. For example the bounding region could be a rectangular region with sides X and Y, where X=2Y and the Y dimension is aligned with the direction of motion of the receiver.

Figure 8:
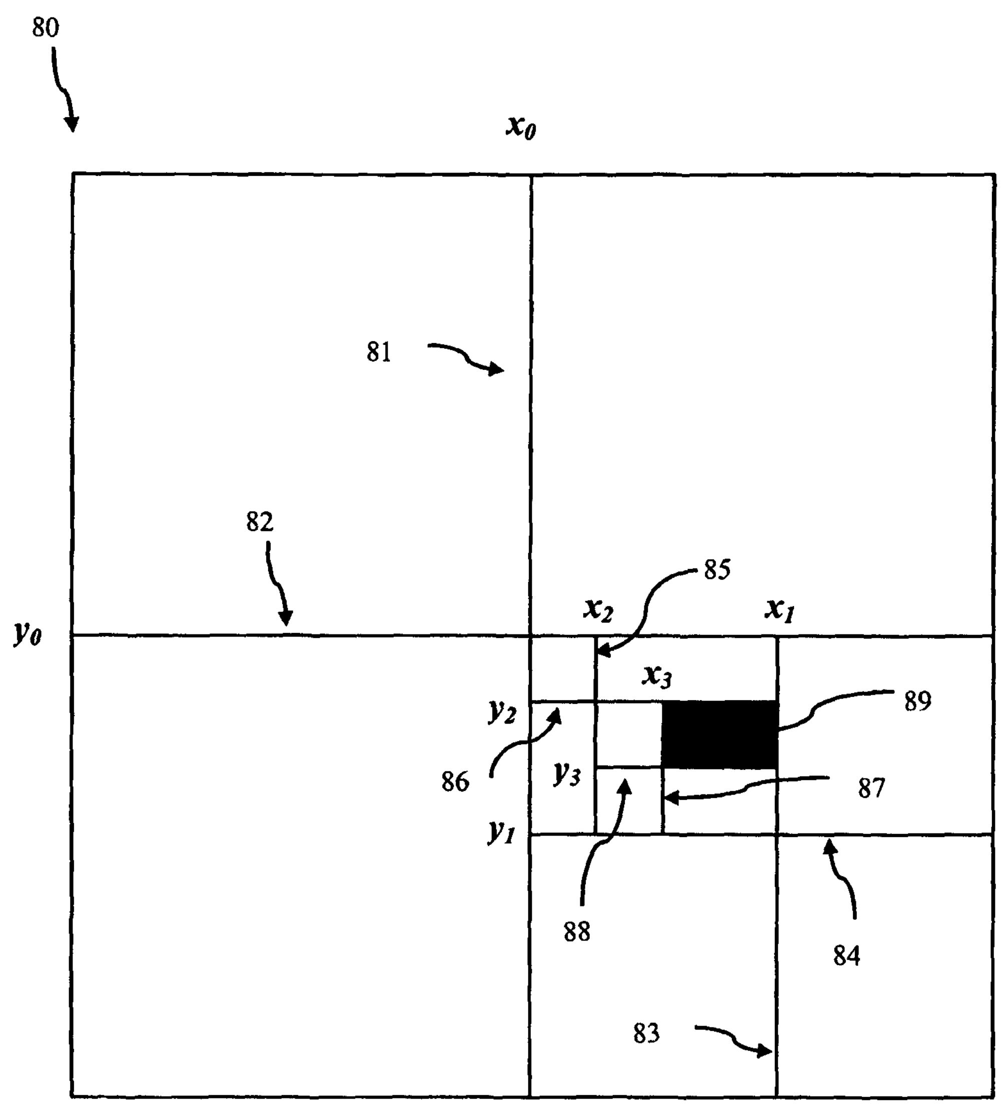
FIG. 8 is a schematic diagram of irregular grid slot allocation scheme according to an embodiment.
Figure 9:
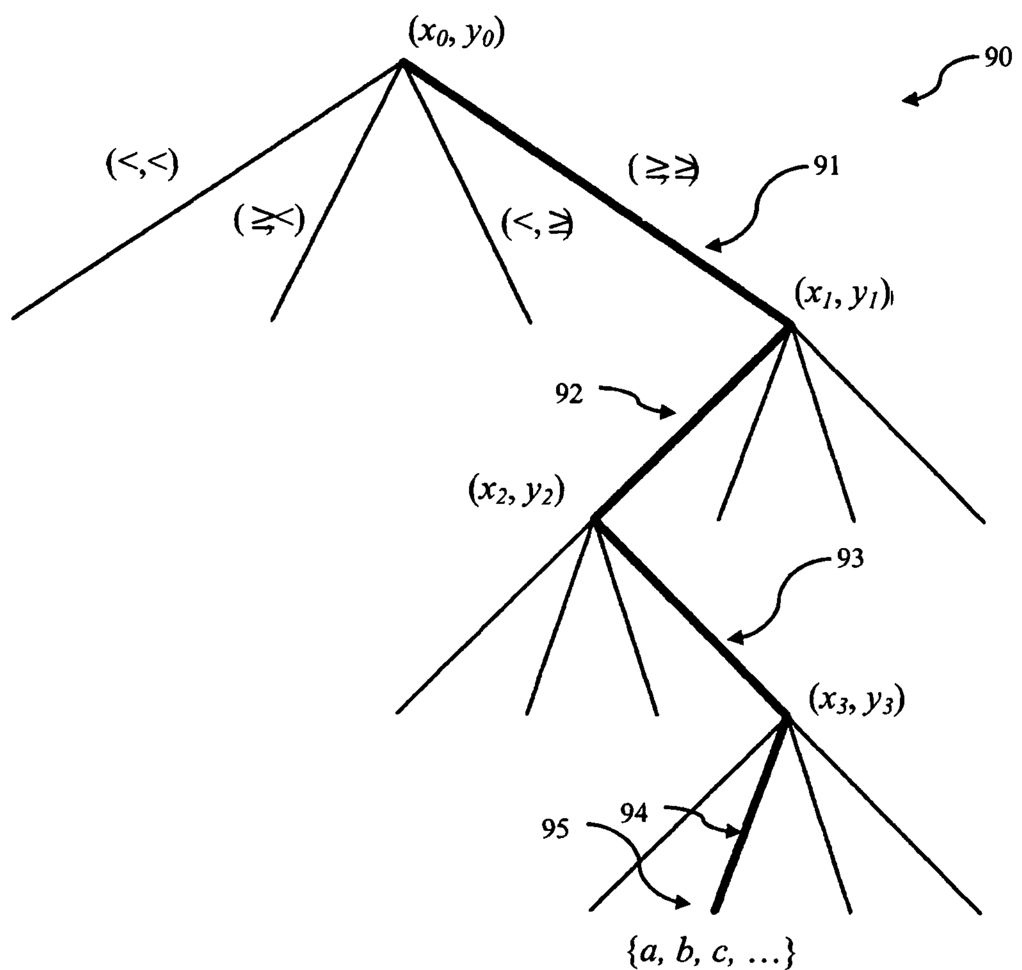
FIG. 9 is a schematic diagram of a slot plan database stored as a tree according to an embodiment.

As mentioned earlier, it is convenient to store the slot plan database using a tree data structure. The tree consists of nodes and branches. One node is identified as the root node. The depth of a node is the number of branches between it and the root. The root is depth zero. Child branches connect parent nodes at depth d to child nodes at depth d+1. FIG. 8 is a schematic diagram 80 of an irregular partition of an area according to an embodiment and FIG. 9 is a schematic diagram 90 of a slot plan database stored as a tree according to an embodiment. We begin by supposing that we have a given partition of the plane into regions, and a given assignment of slots to regions.

Each level of the tree successively divides the plane into smaller and smaller areas. Each node in the tree is labelled with a pair ($x_i$, $y_i$), where i=0, 1, 2, . . . is a dummy index which ranges from zero up to the total number of nodes in the tree minus one. Each leaf the tree (a leaf is a node with child branches) corresponds to a region of the slot plan is labelled with a set of slots. Each non-leaf node has four children. Each of these corresponds to the four possibilities of comparing an arbitrary point (x, y) to its node label ($x_i$, $y_i$). We label these branches as follows: (<, <) means the area where $x<x_i$, and $y<y_i$; (≥, <) means the area $x \geq x_i$ and $y<y_i$; (<, ≥) means the area $x<x_i$, and $y \geq y_i$ and finally (≥, ≥) means the area $x \geq x_i$ and $y \geq y_i$. Note that we could also use ≤and> in place of <and≥.

The slot selector operates as follows. Given the current position (x, y) it compares this position to the ($x_0$, $y_0$)

associated with the root node. It follows the branch corresponding to the relation between (x, y) and ($x_0$, $y_0$), arriving at node, which for clarity we will suppose has the index 1. It now compares (x, y) to ($x_1$, $y_1$), and takes the corresponding branch. This process is repeated, at each depth of the tree, following the branch corresponding to the outcome of comparing (x, y) with the node label. Upon reaching a leaf, the process terminates, and the slot selector outputs the set of slot identifiers associated with that leaf. FIG. 9 shows an example of this process, depicting the traversal of the tree (only the relevant parts of the tree are shown) that takes place for a terminal located anywhere within the shaded region on FIG. 8. For example we have $x \geq x_0$ and $y \geq y_0$ and thus branch 91 is selected in FIG. 9. With reference to FIG. 8, the location is narrowed to the region bounded by lines 81 ($x_0$) and 82 ($y_0$). In the next comparison we have $x<x_1$ and $y<y_1$, and thus branch 92 is selected, and in FIG. 8, the location is narrowed to the region bounded by lines 81 and 82, and 83 ($x_1$) and 84 ($y_1$). In the next comparison we have $x \geq x_2$ and $y \geq y_2$ and thus branch 93 is selected in FIG. 9. With reference to FIG. 8, the location is narrowed to the region bounded by lines 85 ($x_2$) and 86 ($y_2$), and 83 ($x_1$) and 84 ($y_1$). In the next comparison we have $x \geq x_3$ and $y<y_3$ and thus branch 94 is selected in FIG. 9. With reference to FIG. 8, the location is narrowed to the region bounded by lines 87 ($x_3$) and 86 ($y_2$), and 83 ($x_1$) and 88 ($y_3$). The terminal is thus at a leaf 95 of the tree and the terminal is located in geographic region 89, and an appropriate slot can be selected from slots {a, b, c, , , ,} allocated to this geographic region).

Note that not every leaf in the tree has to be at the same depth. This allows for irregular partitions of the plane. Also note that the ($x_i$, $y_i$), i=0, 1, 2, . . . labelling the nodes do not have to fall on any regular grid. Finally, this whole setup can be extended to a trellis where there can be multiple paths from the root node to any leaf, or similar structures (eg directed acyclic graph). This allows for a more compact representation when multiple regions share the same slot allocation. More sophisticated slot plans (e.g. non-rectangular regions) can also be represented on a tree or trellis, by appropriately modifying the node labels and decision function for traversing the tree.

In another embodiment a hybrid approach may be used in which local coordination is performed by standard or traditional slot allocation methods with global coordination by geographic allocation. In some systems, different groups of terminals may be equipped with a method of locally coordinating their choice of slot within their group. For example, they might access the channel using carrier sense multiple access with collision avoidance. Another example of local coordination is self-organising time division multiple access (SOTDMA). Their local coordination may even be controlled by some centralised controller, e.g. a base station or access point. However different groups of terminals may have no way to globally coordinate their choice of slot, lacking direct communication between groups (for example the groups are located far away from each other and have no direct connection).

Figure 10:
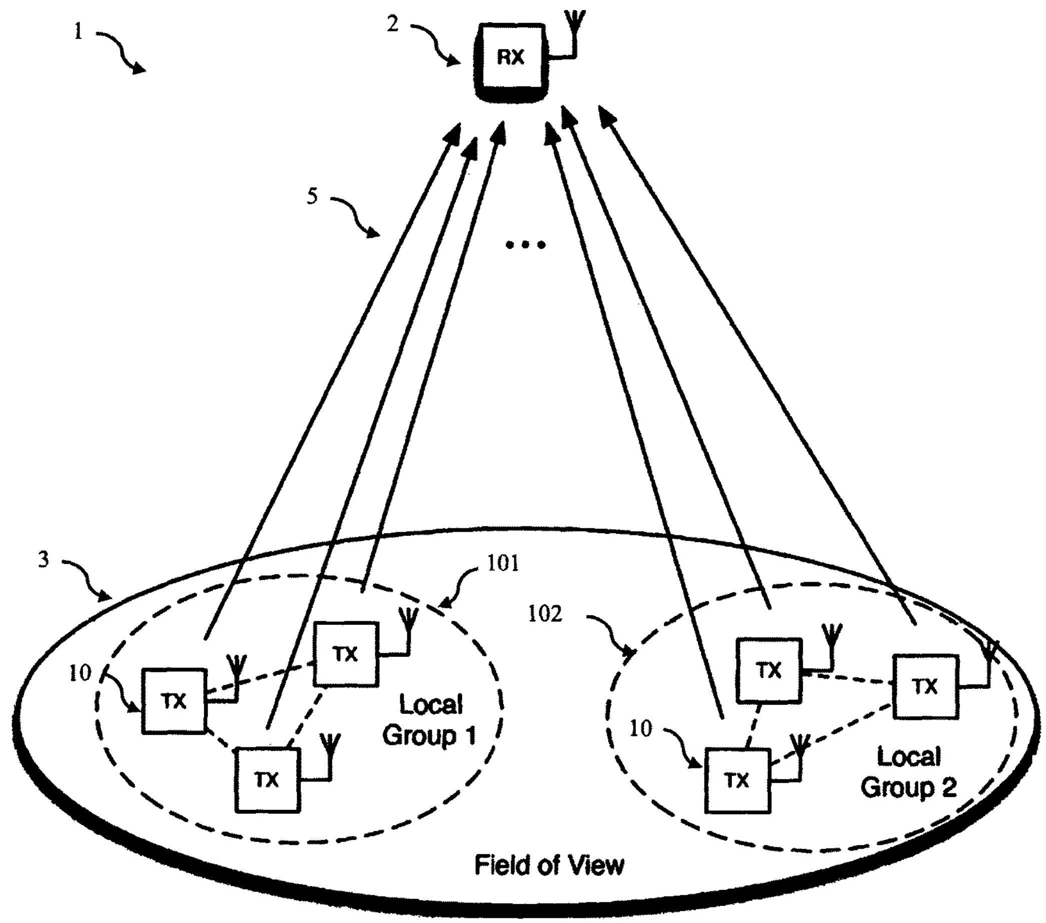
FIG. 10 is a schematic diagram of a communications system using of local coordination of transmitters according to an embodiment.

FIG. 10 is a schematic diagram of a communications system 1 using of local coordination of transmitters according to an embodiment. Transmitters 10 in the field of view 3 of a satellite receiver are grouped into a first local group 101 and a second local group 102. Each of the local groups can locally coordinate their slot selection, however each group is unaware of the other group and its choice of slots. Such a scenario could arise for example in a low earth orbit system where the terminals form a local ad hoc wireless network, however the local groups could be separated by thousands of kilometers and be unaware of each other's existence. The satellite receiver 2 wishes to receive data from all of the terminals. In such scenarios, we can adapt our approach to assign groups of slots to distinct geographic regions (using any of the methods described above). The terminals then perform their own local coordination (using whatever method they choose, such as under the direction of a local controller) within the group, using the group of slots allocated to their region.

Figure 11:
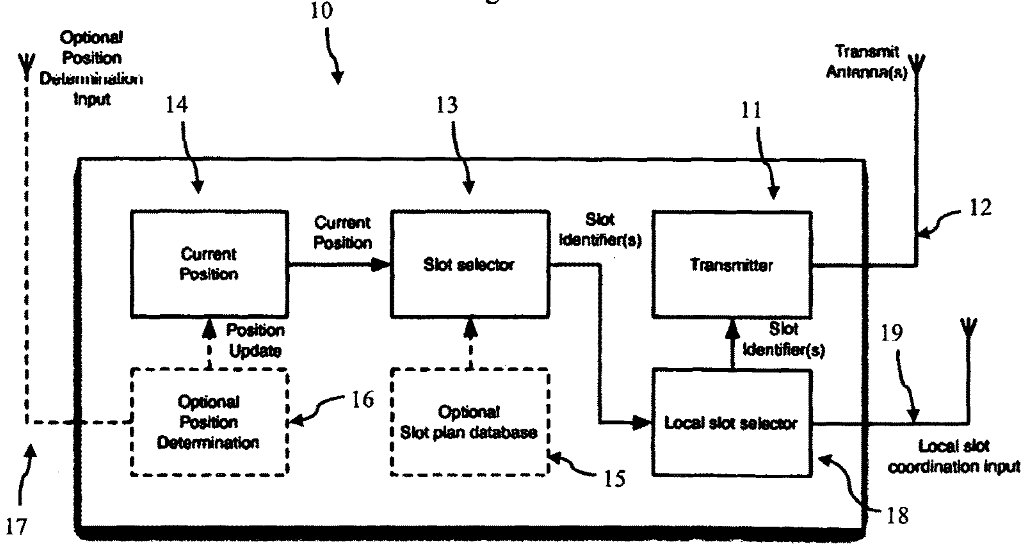
FIG. 11 is a block diagram of a terminal with local slot coordination according to an embodiment.

FIG. 11 is a block diagram of a terminal 10 with local slot coordination according to an embodiment. The transmitter is similar to that shown in FIG. 4, and further includes a local slot selector 18. In this embodiment the slot selector 13 selects a set of slots based upon the current geographic position, and this set of slots is provided to the local slot selector 18, which operates according to whatever local coordination method is in use. The local slot selector 18 takes as input a set of slots from the slot selector 13, and then chooses a slot from within this set. The local slot selector may use local slot coordination input 19, such as an antenna, to assist in choosing the slot. In one embodiment, the antenna may be connected through a subsystem that will provide the input. In one embodiment the subsystem may include a receiver that can detect the presence of other nearby transmitters, e.g. as part of a transceiver performing SOTDMA. In one embodiment the local slot coordination input 19 is connected to another device which may indicate the presence of other local terminals, or provide information or instructions for local slot coordination eg how many terminals, what method to use, or even which slot to choose from the set of slots.

In the example shown in FIG. 10, the first local group 101 could be assigned slots 1 to 10 based upon its geographic position (for example based upon the centre of the field of view), and the second local group 102 could be assigned slots 31 to 40. For example in one embodiment the first local group 101 could use random allocation using the set of slots 1-10 provided by the slot selector, with the three transmitters randomly selecting slots 2, 4 and 7. The second local group 102 could use a fixed allocation scheme within the group. For example each transmitter could be assigned an index i, and the local slot selector would selecting the ith slot in the set of assigned slots. Thus in this case the three transmitters would be assigned slots 31, 32 and 33 from slots 31-40. In another example, the second local group 102 could perform SOTDMA with each terminal electing to transmit only in slots from the set of assigned slots. The local slot selector 18 could be made aware of the presence of other terminals via the local slot coordination input 19 from a receiver that can detect the presence of other nearby transmitters.

Figure 12:
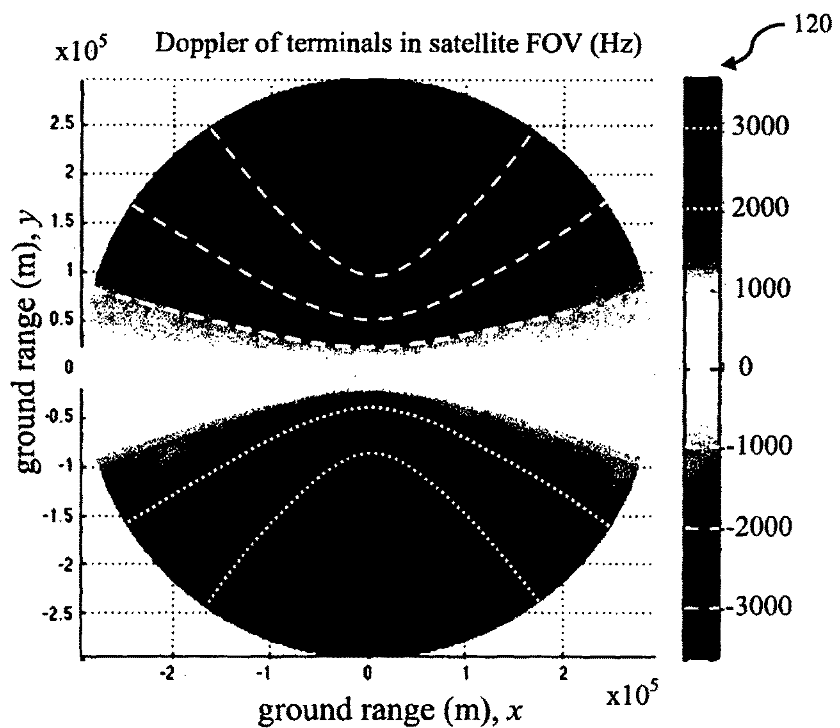
FIG. 12 is plot of the Doppler offset of terminals in the field of view of a low earth orbit satellite according to an embodiment.

The large orbital velocity of a low earth orbit satellite induces significant Doppler offsets in signals transmitted to or from the satellite. FIG. 12 shows a plot of the Doppler offset experienced by terminals located within the field of view of a low earth orbit satellite for a signal transmitted in the VHF band. This offset varies between approximately −3600 Hz up to +3600 Hz and dashed lines indicate offset contours of −1000 Hz, −2000 Hz and −3000 Hz, and dotted lines indicate contours of +1000, +2000 and +3000 Hz. The satellite nadir is at (0, 0) and the figure is oriented so that the satellite track is along the vertical axis, moving from top to bottom.

Figure 13:
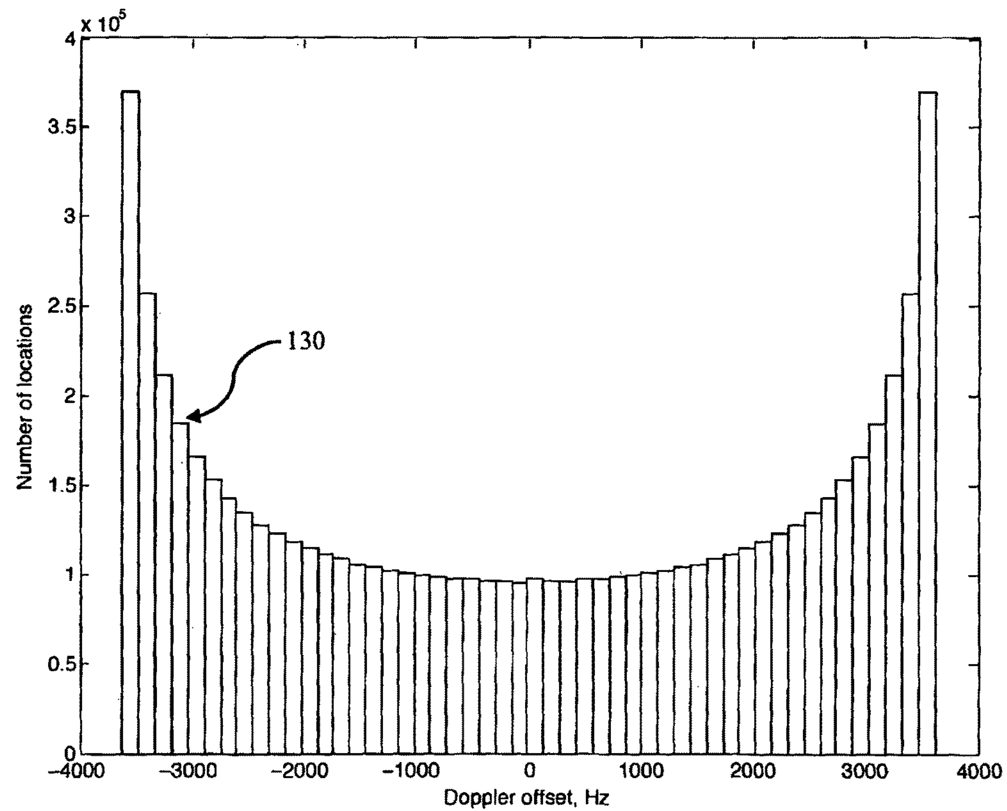
FIG. 13 is a histogram of Doppler offset within the field of view for a 2 km by 2 km grid of locations according to an embodiment.

FIG. 13 is a plot of the corresponding histogram of Doppler offsets from FIG. 12, where we have considered every location on a 2 km by 2 km grid within the field of view. From this histogram, we can see that the distribution of Doppler offset is heavily skewed toward the positive and negative extremes. In an open-loop scenario, where ground based terminals have no way of receiving a signal from the satellite, and additionally do not have any knowledge of the satellite orbits, the terminals do not know ahead of time the Doppler offset that will affect the signals that they transmit to the satellite. As a result, such terminals cannot pre-compensate for the Doppler shift. This unknown Doppler shift can potentially make it difficult to use frequency slotting (channelization) in the schemes described above. However, several novel methods have been developed to exploit the frequency diversity that this Doppler shift offers, and will now be discussed.

Figure 14:
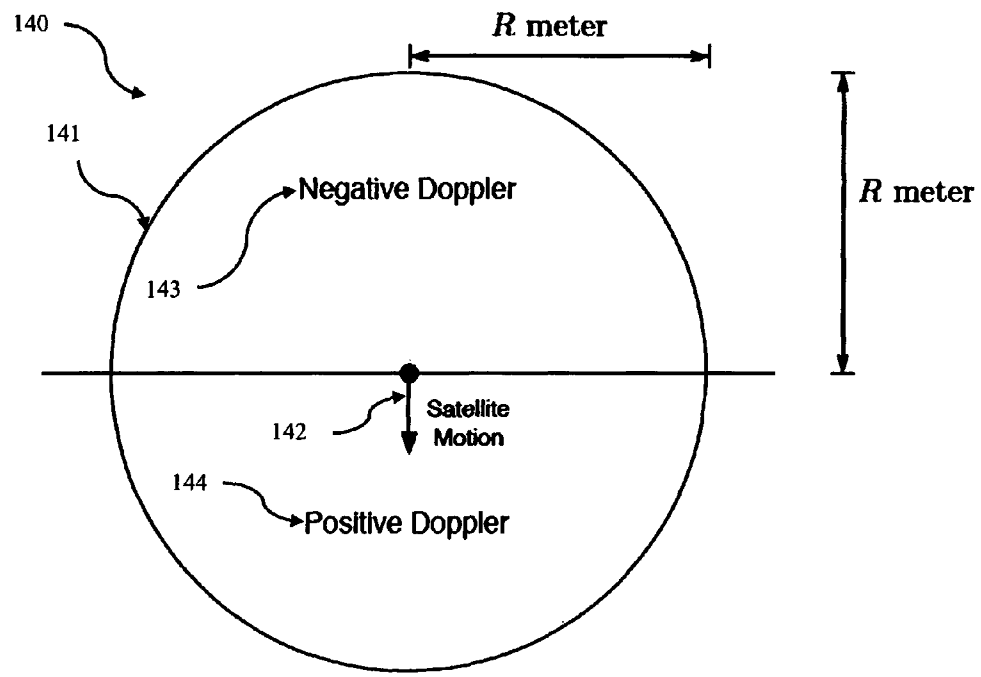
FIG. 14 is a schematic diagram of the division of the field of view into positive and negative Doppler offset according to an embodiment.
Figure 15:
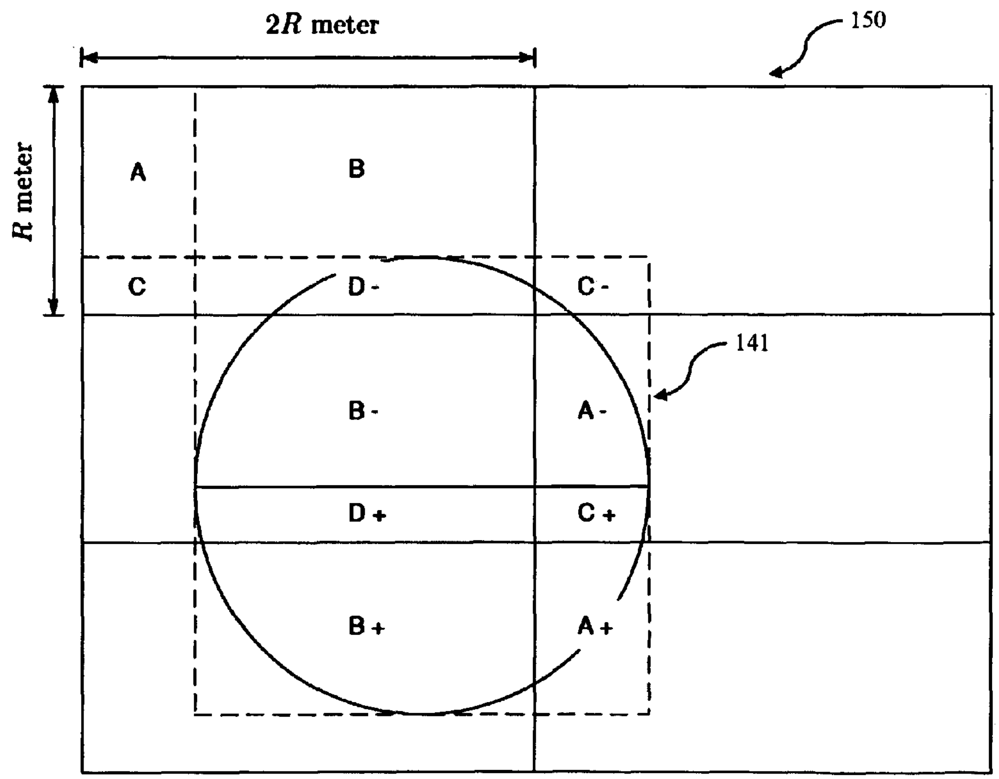
FIG. 15 is a schematic diagram of grid based allocation exploiting Doppler to reuse slots more frequently according to an embodiment.

The first example embodiment is Doppler-induced Frequency Reuse. First, consider a system where the terminals are not free to choose the transmit frequency (for example, due to regulatory constraints). In such a system it is possible to use some other kind of slotting, for example time slotting, and use the unknown Doppler offset to permit tighter spatial reuse of slots. FIG. 14 shows a schematic diagram 140 of the division of the field of view 141 into negative Doppler offsets 143 (trailing the satellite) and positive Doppler offsets 144 (leading the satellite) for a satellite travelling from north to south 142. We can divide the plane into alternating horizontal bands of R meters and adopting one of the geographic based slot plans described above, where the field of view is now redefined to be a rectangle 2R meters horizontally by R meters vertically (instead of 2R×2R). This effectively doubles the number of slots available for allocation. FIG. 15 is a schematic diagram 150 of grid based allocation exploiting Doppler to reuse slots more frequently according to an embodiment. The same idea applies to the other allocation methods described above. We see that just like FIG. 6, we have tiled the plane, where now the field of view 141 is 2R×R (outer bounding the circular satellite field of view by a rectangle). We see that each portion of the slot allocation now appears at most twice within the circular footprint of the satellite. However, each portion appears once with a positive Doppler offset and once with a negative Doppler offset. If the signal bandwidth is relatively narrow compared to the maximum Doppler offset, e.g. 1 kHz for the example of FIG. 12, the positive and negative versions on each slot will be separated in frequency by the Doppler shift. With reference to FIG. 13, the absolute Doppler shift is most likely near the maximum, providing maximal frequency separation. More generally the step of assigning a set of one or more slots to each geographic region could be performed using Doppler induced frequency reuse. In this case the same set of slots are used (or re-used) for both a first geographic region and a second geographic region. These correspond to different regions in a common field of view of the common receiver with the first region having positive Doppler offsets and the second region having negative Doppler offsets.

The second example embodiment is Optimised Probabilistic Frequency Division Multiple Access. FIG. 13 shows that the Doppler offset experienced by a terminal is much more likely to be near the maximum or minimum than somewhere in between. In the method described above, this results in a higher proportion of signals received at maximum or minimum Doppler offset. Suppose that we wish to use (for example) time-frequency slots, defined not only by a particular time duration, but also by a frequency channel. This falls completely within the general concept of a slot described earlier, and all of the methods described so far apply. While we get a substantial benefit (a factor of two) from the Doppler induced frequency reuse, we would get even more benefit if it were possible to arrange the transmissions such that the signals were more uniformly distributed over the frequency band. In the scenario where terminals can control their transmit frequency to some degree, we have developed a novel and powerful method to ensure that the signals received at the satellite are indeed uniformly distributed over the frequency band. The key observation is to determine a distribution of transmission frequencies for the terminals such that, after the effect of Doppler, the satellite sees a uniform distribution. This can be formulated as a problem in numerical optimisation as follows. Let the terminals have a transmission frequency distribution described by the probability density function q(f). Let the distribution of Doppler shifts be described by the probability distribution d(f). Then the distribution of frequency at the satellite is d*f, where * is the linear convolution operator. This is due to the fact that the Doppler shift is additive and that the distribution of the addition of two random variables is well known to be given by their convolution.

We can now solve a numerical optimisation problem to find the optimal q* as follows:

$$q^* = \underset{q}{\operatorname{argmin}} J(d * q) \text{ subject to} \quad \text{Equation 7}$$

$$\int q(f)df = 1 \quad \text{Equation 8}$$

$$q(f) \geq 0 \quad \text{Equation 9}$$

where J(•) is a functional that can be chosen by the designer as any real valued objective function which is small when its argument is “close” to uniform, and large when it is “far away” from uniform. The two constraints on q(f) are to ensure that it is a valid probability density function. This procedure can also be applied to the case that q and/or d are discrete, i.e. are probability mass functions. In that case, the constraints on q(f) become $$\sum_{f_i} q(f_i) = 1 \quad \text{Equation 10}$$

$$q(f_i) \geq 0 \quad \text{Equation 11}$$

where the $f_i$ are a set of discrete frequencies chosen by the designer. Several choices are possible for J. One example is $$J(p(f)) = \|\alpha - p\|_2^2 \quad \text{Equation 12}$$

$$= \int [p(f) - \alpha^2]^2 df \quad \text{Equation 13}$$

where α is the uniform distribution over the support of p. For example if p(f) has support (the range of frequencies over which p(f)>0) equal to W Hz, then α=1/W. This choice of J aims to minimise the least squares difference between p=q*d and the uniform distribution. Another approach would be to set J(p)=−H(p) to be the negative of the Shannon entropy of p. For a discrete distribution p, the entropy is maximised for the uniform distribution. Other objective functionals are possible, and our method applies to all of them. Standard numerical optimisation packages can be used to implement the required constrained minimisation. For example, the least squares approach can be solved in MATLAB using the function lslin. In Mathematica, the function FindMinimum can be used, even for non-linear objective functions.

Figure 16:
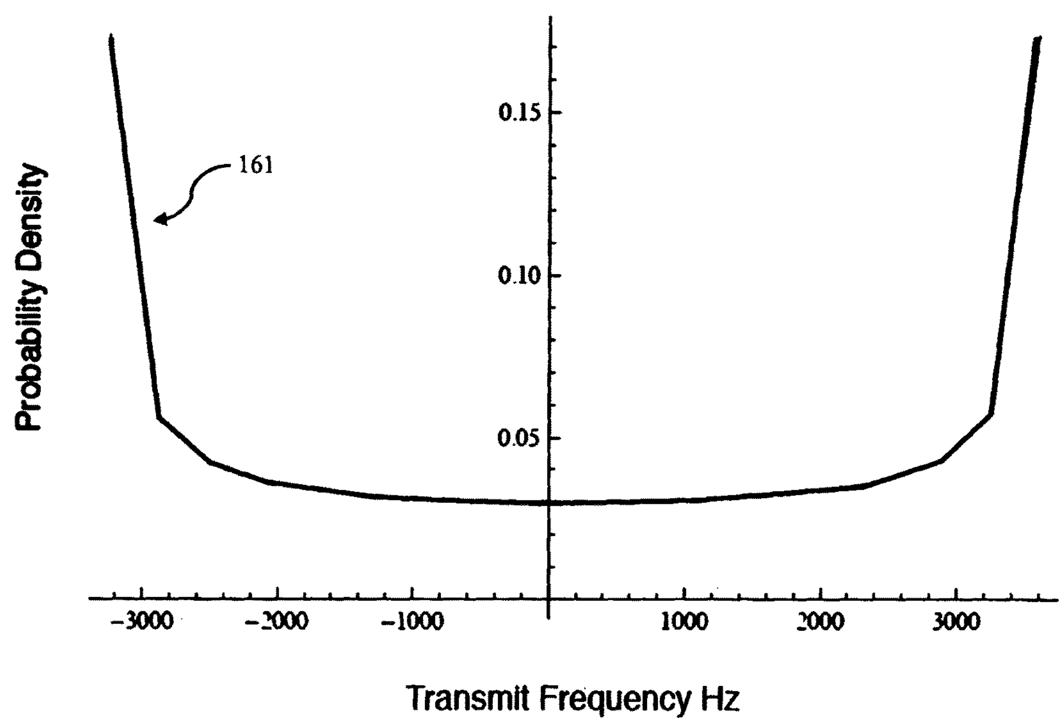
FIG. 16 is a plot of the result of optimising the transmit frequency distribution for the given Doppler distribution of FIG. 13 according to an embodiment.

FIG. 16 is a plot 161 of the result of optimising the transmit frequency distribution for the given Doppler distribution of FIG. 13 according to an embodiment. For this example, the Shannon entropy was taken as the objective functional. Using the least mean squares approach yields a similar (but different) result.

Figure 17:
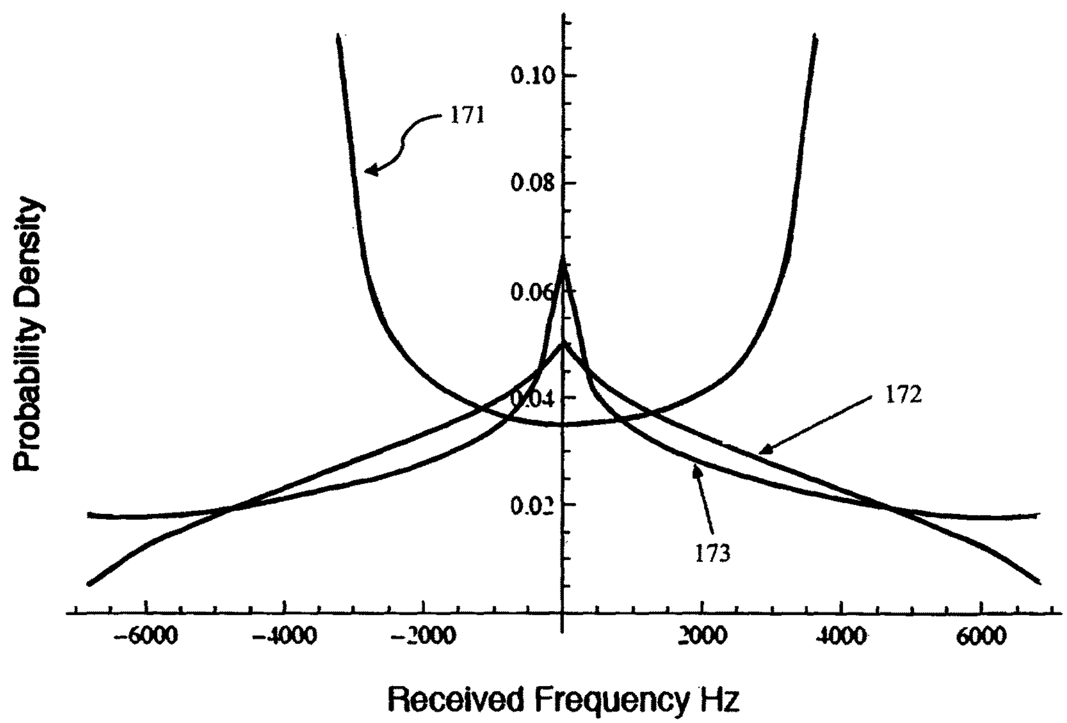
FIG. 17 is a plot showing the distribution of frequencies at the satellite receiver for the cases where the transmitters all transmit at the same centre frequency, and where the transmitter transmit using a uniform transmit distribution and the optimised transmit frequency distribution shown in FIG. 16 according to an embodiment.

FIG. 17 is a plot of the distribution of frequencies at the satellite receiver for several transmit frequency distributions—the un-optimised distribution 171, the uniform transmit distribution 172 and the optimised transmit distribution 173. Each curve is the resulting distribution at the receiver after passing through the channel and includes the combined effect of the applied transmit offset and channel Doppler effect. In each case the transmitters all transmit at the same centre frequency and the centre frequency has been subtracted to centre the graph at 0 Hz. The un-optimised distribution 171 is shown for reference and in this case no frequency offsets are applied at the transmitters and the resultant distribution at the receiver illustrates the channel induced frequency offsets due to Doppler effects (ie no optimisation case). The uniform transmit distribution 172 illustrates is the resulting distribution at the receiver where the transmitters apply a frequency offset selected from a uniform distribution. That is the probability density function $q^*$ for the transmission frequencies used by the terminals is uniform. The optimised transmit frequency distribution 173 illustrates is the resulting distribution at the receiver where the transmitters apply a frequency offset from an optimised distribution. In this case the optimised distribution is obtained by optimising the transmit frequency distribution for the given Doppler distribution of FIG. 13 as outlined above. Using the optimised transmit frequency distribution 173 gets the received spectrum closer (in fact as close as possible) to a uniform distribution at the receiver. We can see that not only do we improve the shape of the received distribution, we have also increased the overall bandwidth (doubled in this example—compare the optimised distribution 173 with the un-optimised distribution 171). This has the additional benefit of increasing the number of slots available for use. Once an optimal transmit frequency distribution $q^*$ is obtained, it can be applied in several ways. First, each terminal could choose a random frequency offset according to the distribution $q^*$. With many terminals uniformly distributed over the field of view, the satellite will see the optimised distribution $d^*q^*$. Alternatively, we can assign frequencies deterministically to terminals by associating frequencies to slots in a geographic slot plan (using any of the methods described earlier), where we ensure that the proportion of each frequency used in the slot plan is according to $q^*$. We also observe that applying the uniform transmit frequency distribution 172 results in a received spectrum that is much closer to the uniform distribution than the un-optimised distribution 171, but avoids the effort of calculating an optimised distribution. We may also design the transmission frequency distribution such that it is limited within a certain (ie predefined) bandwidth, at the transmitter and/or at the receiver (taking into account the expected Doppler distribution). For example the predefined bandwidth may be defined in order to meet system or regulatory constraints (in which case its value can be determined during system design or configuration).

Embodiments of the methods and transmitters may be implemented in a range of wireless communication systems using a wide range of communication technologies. This may include wireless communication systems, and transmitters and receivers described in Australian Provisional Patent Application No. 2012904130 titled "Communication system and method" filed on 21 Sep. 2012; and Australian Provisional Patent Application No. 2012904145 entitled "Multi-access Communication System" filed on 21 Sep. 2012. The content of each of these applications is hereby incorporated by reference in their entirety. Embodiments can be used in communication systems for supporting widely distributed sensor and devices, such as terrestrial and maritime field sensors and industrial automation and control equipment. The capability to support such devices and sensors has the potential to deliver significant economic and environmental benefits in areas such as environmental monitoring for climate change, water, mining, agriculture, Defence and National security. For example potential applications include supporting communications with long range oceanic environmental monitoring for environmental, economic and national security reasons or remote monitoring of unattended ground sensors or assets. For such sensors satellite or airborne communications is the only feasible solution for extraction of data from these sensor and assets. Embodiments of the methods described herein enable efficient slot allocation to support large numbers of distributed terminals.

Various methods and systems have been described herein which provide solutions for determining how to allocate terminals to slots in order to maximise (or improve) communication system performance, particularly in the case where there is no feedback channel between a receiver (such as a satellite receiver) and terminals within the field of view (or receiver area) of the receiver. However it is to be understood that the methods described herein can also be applied in communication systems where a feedback channel is present but is either not being used, or is being used for some other purpose. Similarly embodiments of the methods described herein can also be used to assist in slot allocation in the case where a feedback channel is being used to coordinate transmissions from several terminals. The approach taken is to use geographic position information available to the terminals on their geographic position in order to select a slot for a terminal to use to communicate (ie send transmissions) to the receiver. Terminals can be programmed with a slot selector to choose slots according to some deterministic or non-deterministic function of the current position. A slot plan database may be used to assist in efficient slot selection. The approach has several advantages. There is no requirement for feedback from the terminal to the receiver, or for communication between terminals. Also it does not require real-time central coordination of slot selection, and supports terminal mobility and/or a moving field of view (ie moving satellite, or long range unmanned aerial vehicle (UAV)). The approach can also greatly reduce or eliminate the probability of failure at the receiver. This has numerous implementation advantages such as reduced cost, complexity, and power consumption. The methods can be used in the case where the receiver is a multiple access or multiuser receiver that can successfully decode $m \geq 1$ simultaneous transmissions within a single slot. It is to be noted that the methods can still be used in the case where the receiver can only decode a single transmission in a slot (ie $m=1$). In, this case the methods described can be used to help distribute transmissions to avoid overlap.

The slot plan used by the slot plan database may allocate each slot once within the field of view. Use of the geographic position, allows the terminally to autonomously decide which slot to use. The slot plan may be based upon tiling regions within a rectangular grid. In such scenarios, this grid based assignment eliminates the probability that too many terminals transmit using the same slot within the field of view, no matter where the field of view is placed on the plane. This tiling of grid assignments demonstrates that it is possible to devise a slot plan which has the property that no matter where the field of view is placed, each slot is used only m times within the field of view. This allows us to eliminate the probability that the multiuser decoder cannot decode due to too many terminals decoding in the same slot. This provides a significant benefit compared to the random access method described above.

The plan may use an irregular grid and allocation using graph colouring. Further slots geographic regions may be defined within the field of view, with each region assigned a group of slots. Allocation of slots from the assigned group may be locally coordinated within the group. The slot plan database may be stored as a tree or trellis structure which can be efficiently searched. In a further aspect the field of view may be divided into positive and negative Doppler regions and slots may be reused in the two regions to double the number of slots available for allocation. Further benefit may be obtained by allocation of slots so that the receiver sees an approximately uniform distribution of frequencies over the frequency band. This may be further based upon obtaining a probability density function $q^*$ for the transmission frequencies used by the terminals. This may be obtained based upon numerical optimisation techniques.

Figure 19:
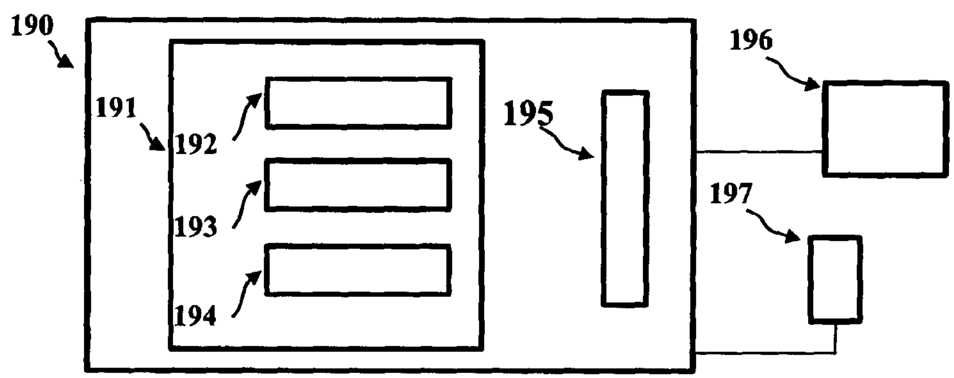
FIG. 19 is a block diagram of a computing device according to an embodiment.

The methods described herein may be a computer implemented using one or more computing devices. The computing device may comprise a processor and a memory, and one or more input or output devices. The memory may comprise instructions to cause the processor to execute a method described herein. These instructions may be stored as computer codes, which are loaded and executed. The computing device may be a standard computing device, such as a desktop computer or laptop, a server or a portable computing device or board for inclusion in another apparatus or system. The computing device may be an embedded system in an apparatus. The computing device may be a unitary computing or programmable device, or a distributed device comprising several components operatively (or functionally) connected via wired or wireless connections. An embodiment of a computing device 190 is illustrated in FIG. 19 and comprises a central processing unit (CPU) 191, a memory 195, an optionally a display apparatus 196 and an input device 197 such as keyboard, mouse, etc. The CPU 191 comprises an Input/Output Interface 192, an Arithmetic and Logic Unit (ALU) 193 and a Control Unit and Program Counter element 194 which is in communication with input and output devices through the Input/Output Interface. The Input/Output Interface may comprise a network interface and/or communications module for communicating with an equivalent communications module in another device using a predefined communications protocol (e.g. Bluetooth, Zigbee, IEEE 802.15, IEEE 802.11, TCP/IP, UDP, etc). A graphical processing unit (GPU) may also be included. The display apparatus may comprise a flat screen display (eg LCD, LED, plasma, touch screen, etc), a projector, CRT, etc. The computing device may comprise a single CPU (core) or multiple CPU's (multiple core). The computing device may use a parallel processor, a vector processor, or be a distributed computing device. The memory is operatively coupled to the processor(s) and may comprise RAM and ROM components, and may be provided within or external to the device. The memory may be used to store the operating system and additional software modules that can be loaded and executed by the processor(s).

Those of skill in the art would understand that information and signals may be represented using any of a variety of technologies and techniques. For example, data, instructions, commands, information, signals, bits, symbols, and chips may be referenced throughout the above description may be represented by voltages, currents, electromagnetic waves, magnetic fields or particles, optical fields or particles, or any combination thereof.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two. For a hardware implementation, processing may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. A central processing unit (CPU) may be used, containing an Input/Output Interface, an Arithmetic and Logic Unit (ALU) and a Control Unit and Program Counter element which is in communication with input and output devices or modules through the Input/Output Interface, and a memory. Software modules, also known as computer programs, computer codes, or instructions, may contain a number a number of source code or object code segments or instructions, and may reside in any computer readable medium such as a RAM memory, flash memory, ROM memory, EPROM memory, registers, hard disk, a removable disk, a CD-ROM, a DVD-ROM or any other form of computer readable medium. In the alternative, the computer readable medium may be integral to the processor. The processor and the computer readable medium may reside in an ASIC or related device. The software codes may be stored in a memory unit and executed by a processor. The memory unit may be implemented within the processor or external to the processor, in which case it can be communicatively coupled to the processor via various means as is known in the art.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the invention is not restricted in its use to the particular application described. Neither is the present invention restricted in its preferred embodiment with regard to the particular elements and/or features described or depicted herein. It will be appreciated that the invention is not limited to the embodiment or embodiments disclosed, but is capable of numerous rearrangements, modifications and substitutions without departing from the scope of the invention.

The invention claimed is:

1. A method for allocating a time-frequency transmission slot to a terminal in a Low Earth Orbit (LEO) satellite communication system, the method comprising:

obtaining a geographic position of the terminal, wherein the communication system comprising a plurality of terminals and a receiver in a LEO satellite for receiving transmissions from the plurality of terminals wherein the plurality of terminals can control a transmission frequency, the receiver having a field of view, wherein the terminal is one of the plurality of terminals; and allocating the time-frequency transmission slot based upon the obtained geographic position of the terminal, wherein there is no feedback channel from the receiver to the plurality of terminals or a feedback channel from the receiver to the plurality of terminals is present but is not being used for allocation of the time-frequency transmission slot to the terminal and allocation of the time-frequency transmission slot is performed independently of the receiver and allocation exploits the frequency diversity resulting from the LEO satellite induced Doppler shifts in signals transmitted to the LEO satellite by either deterministically assigning a slot from a slot plan data stored by the terminal that exploits Doppler induced frequency reuse or assigning a slot using a probabilistic sampling approach based on a probability density function q* for the transmission frequencies used by the plurality of terminals wherein q* is selected such that, after the effect of Doppler, the signals from the plurality of terminals received by the receiver in the LEO satellite are expected to be uniformly distributed over the frequency band.

2. The method as claimed in claim 1, wherein the geographic position of the terminal is obtained from a memory, a position determination module, or over a communication link.

3. The method as claimed in claim 1, wherein the slot plan database comprises a plurality of geographic regions, and each geographic region is associated with a set of one or more slots and the same set of slots are used for both a first region and a second region, and the first and second regions correspond to different regions in the field of view of the receiver, the first region having positive Doppler offsets and the second region having negative Doppler offsets such that at the receiver a transmission from the first region will be separated in frequency from a transmission from the second region due to a Doppler shift, and allocating the time-frequency transmission slot comprises the further steps of:

determining the geographic region that contains the geographic position of the terminal; and selecting a slot from the set of one or more slots associated with the determined geographic region.

4. The method as claimed in claim 3, wherein each of the geographic regions in the slot plan database has a boundary, and each of the boundaries are determined based upon the statistical spatial distribution of terminals.

5. The method as claimed in claim 3, wherein the receiver is a multiuser receiver that can successfully decode m simultaneous transmissions within a single slot and each slot is associated with at most m in regions, where m is greater than 1.

6. The method as claimed in claim 3, wherein the plurality of geographic regions form an operating region and each of the geographic regions in the slot plan database has a boundary, and the boundaries of the regions are irregular such that regions form an irregular partition of the operational region.

7. The method as claimed in claim 3, further comprising the step of assigning a set of one or more slots to each geographic region using a graph colouring algorithm, wherein each geographic region is associated with a single vertex in a graph, and an edge is created between any pair of vertexes in the graph which are within a bounding region.

8. The method as claimed in claim 7, wherein the bounding region is a smallest circle that completely bounds an estimated field of view of the receiver.

9. The method as claimed in claim 3, wherein each of the geographic regions is a rectangle geographic region and the slot plan database stores geographic regions which form a rectangular grid, and the step of determining the geographic region that contains the geographic position of the terminal comprises determining a geographic region number.

10. The method as claimed in claim 3, wherein the set of one or more slots is a plurality of slots, and the step of selecting a slot from the set of one or more slots associated with the determined geographic region is performed by locally coordinating selection of the slot from the set of slots within a local group of terminals.

11. The method as claimed in claim 3, where the slot plan database is stored as either a tree data structure, or a trellis data structure.

12. The method as claimed in claim 1, wherein assigning the slot using a probabilistic sampling approach comprises each terminal randomly choosing a frequency offset based upon the probability density function q* for the transmission frequencies used by the plurality of terminals.

13. The method as claimed in claim 12, wherein the probability density function q* for the transmission frequencies used by the plurality of terminals is uniform or is obtained by a numerical simulation.

14. A terminal for use in a Low Earth Orbit (LEO) satellite communication system comprising:

a receiver in a LEO satellite; and a plurality of terminals, wherein the terminal is one of the plurality of terminals, the terminal comprising:

a transmitter configured to allow the terminal to control a transmission frequency;

a position module which obtains a geographic position of the terminal; and a slot selector module for selecting a time-frequency transmission slot based upon the obtained geographic position, wherein there is no feedback channel from the receiver to the terminal or a feedback channel from the receiver to the terminal is present but is not being used for allocation of the time-frequency transmission slot to the terminal and allocation of the time-frequency transmission slot to the terminal is performed independently of the receiver and the slot selector module is configured to exploit the frequency diversity resulting from the LEO satellite induced Doppler shifts in signals transmitted to the LEO satellite by either deterministically assigning a slot from a slot plan data stored by the terminal that exploits Doppler induced frequency reuse or assigning a slot using a probabilistic sampling approach based on a probability density function q* for the transmission frequencies used by the plurality of terminals wherein q* is selected such that, after the effect of Doppler, the signals from the plurality of terminals received by the receiver in the LEO satellite are expected to be uniformly distributed over the frequency band.

15. The terminal as claimed in claim 14, wherein the position module obtains the geographic position from at least one of a memory; a position determination module for estimating the position of the terminal or a position receiver for receiving a position over a communication link.

16. The terminal as claimed in claim 14 further comprising:

a local slot selector module and a local slot coordination input, wherein the slot selector module is further configured to provide a plurality of slots based upon the obtained position to the local slot selector module, and the local slot selector module is configured to select a slot from the plurality of slots based using local coordination with one or more transmitters using a local coordination input received from local slot coordination input.

17. The terminal as claimed in claim 14, wherein the slot plan database comprises:

a plurality of geographic regions, and each geographic region is associated with a set of one or more slots, and the same set of slots are used for both a first region and a second region, and the first and second regions correspond to different regions in the field of view of the receiver, the first region having positive Doppler offsets and the second region having negative Doppler offsets such that at the receiver a transmission from the first region will be separated in frequency from a transmission from the second region due to a Doppler shift and the slot selector module is configured to determine the geographic region that contains the geographic position of the terminal and select a slot from the set of one or more slots associated with the determined geographic region.

18. A Low Earth Orbit (LEO) satellite communication system, comprising:

a plurality of terminals; and a receiver in a LEO satellite for receiving transmissions from the plurality of terminals, each terminal comprising:

a transmitter configured to allow the terminal to control a transmission frequency;

a position module which obtains a position of the terminal; and a slot selector module for selecting a time-frequency transmission slot based upon the obtained position of the terminal, wherein there is no feedback channel from the receiver to the plurality of terminals or a feedback channel from the receiver to the plurality of terminals is present but is not being used for allocation of the time-frequency transmission slot to the terminal and allocation of the time-frequency transmission slot to the terminal is performed independently of the receiver and the slot selector module is configured to exploit the frequency diversity resulting from the LEO satellite induced Doppler shifts in signals transmitted to the LEO satellite by either deterministically assigning a slot from a slot plan data stored by the terminal that exploits Doppler induced frequency reuse or assigning a slot using a probabilistic sampling approach based on a probability density function q* for the transmission frequencies used by the plurality of terminals wherein q* is selected such that, after the effect of Doppler, the signals from the plurality of terminals received by the receiver in the LEO satellite are expected to be uniformly distributed over the frequency band.

19. The method as claimed in claim 1 wherein the slot plan database comprises a plurality of geographic regions, and each geographic region is associated with a set of one or more slots, and a plurality of frequencies are associated with slots wherein the proportion of each frequency used in the slot plan database is selected according to the probability density function q* and allocating the time-frequency transmission slot comprises the steps of determining the geographic region that contains the geographic position of the terminal and selecting a slot from the set of one or more slots associated with the determined geographic region wherein the frequency associated with the selected slot is used as the transmission frequency.

20. The terminal as claimed in claim 14, wherein the slot selector module is configured to randomly choose a frequency offset based upon the probability density function q* for the transmission frequencies to be used by the plurality of terminals.

21. The terminal as claimed in claim 20 wherein the probability density function q* for the transmission frequencies used by the plurality of terminals is uniform or obtained by numerical simulation.

22. The terminal as claimed in claim 14, wherein the slot plant data base comprises a plurality of geographic regions, and each geographic region is associated with a set of one or more slots, and a plurality of frequencies are associated with slots in the slot plan database wherein the proportion of each frequency used in the slot plan database is selected according to the probability density function q* and the slot selector module is configured to select a slot from the set of one or more slots associated with the geographic position obtained from the position module wherein the frequency associated with the selected slot is used as the transmission frequency.

* * * * *